United States Patent [19]

Tada

[11] Patent Number: 5,575,248
[45] Date of Patent: Nov. 19, 1996

[54] INDUCTION SYSTEM AND METHOD OF OPERATING AN ENGINE

[75] Inventor: Atsushi Tada, Iwata, Japan

[73] Assignee: Yamaha Hatsudoki Kabushiki Kaisha, Iwata, Japan

[21] Appl. No.: 192,735

[22] Filed: Feb. 7, 1994

[30] Foreign Application Priority Data

| Feb. 5, 1993 | [JP] | Japan | 5-018994 |
| Feb. 5, 1993 | [JP] | Japan | 5-018995 |
| Feb. 5, 1993 | [JP] | Japan | 5-018996 |

[51] Int. Cl.$^6$ ............................. F01L 3/20; F02M 35/10
[52] U.S. Cl. ............... 123/184.56; 123/590; 123/306
[58] Field of Search ................. 123/184.56, 184.53, 123/184.21, 590, 537, 568, 306

[56] References Cited

U.S. PATENT DOCUMENTS

| 4,095,569 | 6/1978 | Nobuaki et al. | 123/119 A |
| 4,232,645 | 11/1980 | Shiber | 123/590 |
| 4,317,438 | 3/1982 | Yagi et al. | 123/432 |
| 4,320,725 | 3/1982 | Rychlik | 123/188 M |
| 4,465,035 | 8/1984 | Carr | 123/184.56 |
| 4,499,868 | 2/1985 | Kanda et al. | 123/306 |
| 4,663,938 | 5/1987 | Colgate | 60/620 |
| 4,669,434 | 6/1987 | Okumura et al. | 123/308 |
| 4,719,886 | 1/1988 | Kotani et al. | 123/308 |
| 4,750,466 | 6/1988 | Hibino et al. | 123/571 |
| 4,753,200 | 6/1988 | Kawamura et al. | 123/306 |
| 4,762,102 | 8/1988 | Kanda | 123/302 |
| 4,827,883 | 5/1989 | Khalighi et al. | 123/308 |
| 4,834,035 | 5/1989 | Shimada et al. | 123/308 |
| 4,858,567 | 8/1989 | Knapp | 123/184.56 |
| 4,928,638 | 5/1990 | Overbeck | 123/184.56 |
| 4,974,566 | 12/1990 | LoRusso et al. | 123/308 |
| 4,998,518 | 3/1991 | Mitsumoto | 123/306 |
| 5,002,026 | 3/1991 | Ohkumo et al. | 123/339.22 |
| 5,172,674 | 12/1992 | Horie et al. | 123/571 |
| 5,216,985 | 6/1993 | Brummer et al. | 123/184.56 |
| 5,235,946 | 8/1993 | Fodale et al. | 123/339.22 |
| 5,301,648 | 4/1994 | Uchinami | 123/491 |
| 5,311,848 | 5/1994 | Isaka et al. | 123/184.56 |

FOREIGN PATENT DOCUMENTS

| 0054964 | 12/1981 | European Pat. Off. |
| 0068481 | 6/1982 | European Pat. Off. |
| 0235288 | 8/1985 | European Pat. Off. |
| 0221312 | 5/1987 | European Pat. Off. |

(List continued on next page.)

OTHER PUBLICATIONS

JP-A-61 160 250 (Fuji Heavy Ind Ltd) 21 Jul. 1986. Patent Abstracts of Japan, vol. 10, No. 378 (M-546) 17 Dec. 1986.
JP-A-61 169 620 (Fuji Heavy Ind Ltd) 31 Jul. 1986. Patent Abstracts of Japan, vol. 12, No. 418 (M-871) 18 Sep. 1989.
JP-A-01 155 075 (Madza Motor Corp) 16 Jun. 1989. Patent Abstracts of Japan, vol. 10, 365 (M-542) 6 Dec. 1986.
JP-A-61 160 519 (Isuzu Motors Ltd) 21 Jul. 1986. Patent Abstracts of Japan, vol. 6, No. 106 (M-213) 10 May 1983.
JP-A-58 027 867 (Suzuki Jidosha Kogyo KK) 18 Feb. 1983.
Patent Abstracts of Japan vol. 10, No. 176 (M-491) (2232) 20 Jun. 1986 & JP-A-61 25 916 (Mazdo Motor Corp) 5 Feb. 1986 (abstact).

*Primary Examiner*—David A. Okonsky
*Attorney, Agent, or Firm*—Knobbe, Martens, Olson & Bear

[57] ABSTRACT

An induction system and control method for an internal combustion engine that will improve running under low speed, low load conditions by increasing turbulence in the combustion chamber through the use of a control valve positioned in the induction system for the engine. Under high speed, high load conditions, the control valve is held in an open position and thus, the engine is capable of obtaining high output since there is no restriction to the intake air flow. In addition, transient conditions of the engine, such as variations in idle speed, variations in the amount of EGR, changes in speed, such as acceleration or deceleration, starting and warmup, are compensated for by positioning the throttle control valve to obtain optimum performance, and in some instances, the amount of fuel supplied to the engine is also varied so as to improve exhaust emission control and reduce fuel consumption.

264 Claims, 23 Drawing Sheets

FOREIGN PATENT DOCUMENTS

| | | | |
|---|---|---|---|
| 0483581 | 5/1992 | European Pat. Off. | 123/184.56 |
| 0500124 | 8/1992 | European Pat. Off. | |
| 0520518 | 12/1992 | European Pat. Off. | |
| 3429414 | 8/1984 | Germany | |
| 3638021 | 11/1986 | Germany | |
| 3743056 | 7/1988 | Germany | 123/184.56 |
| 51-54007 | 12/1976 | Japan | |
| 56-43428 | 4/1981 | Japan | |
| 56-139829 | 10/1981 | Japan | |
| 59-5767 | 2/1984 | Japan | |
| 60-11206 | 3/1985 | Japan | |
| 61-12940 | 1/1986 | Japan | |
| 61-144223 | 9/1986 | Japan | |
| 62-13768 | 1/1987 | Japan | 123/184.56 |
| 63-32122 | 2/1988 | Japan | |
| 63-73532 | 5/1988 | Japan | |
| 63-73534 | 5/1988 | Japan | |
| 64-29617 | 1/1989 | Japan | 123/184.56 |
| 2-115922 | 9/1990 | Japan | |
| 2-230920 | 9/1990 | Japan | |
| 2031999 | 4/1980 | United Kingdom | 123/184.56 |
| 2242226 | 9/1991 | United Kingdom | |
| 91/14858 | 10/1991 | WIPO | |

5,575,248

INDUCTION SYSTEM AND METHOD OF OPERATING AN ENGINE

BACKGROUND OF THE INVENTION

This invention relates to an induction system for an internal combustion engine and to a method of operating an engine and more particularly to an induction system and method of operating an engine to improve performance under certain types of transient conditions. As is well known, the induction system for an internal combustion engine is particularly important in determining the performance of the engine. Induction systems in conventional engines generally represent a compromise between the free-breathing type of induction systems that provide high performance by introducing the charge into the combustion chamber in an unrestricted fashion and without introducing turbulence to the inducted air charge and the low speed or mid-range type of induction system that provides a higher flow velocity and turbulence in the combustion chamber. The free breathing system, although it permits maximum charging and high performance, will provide less than desirable performance under low speed, low load conditions. An induction system that provides good performance under low load conditions, however, will not offer the ability to induct sufficient air so as to achieve maximum performance. Therefore, it has been the practice with conventional engines to compromise the induction system between these two extremes.

There have also been provided induction systems that include devices for introducing turbulence and/or high velocity to the intake charge under some running conditions and substantially unrestricted induction under high speed high load conditions. One such system is described in the co-pending application of Yoshiharo Isaka entitled "Tumble Control Valve for Intake Port," Ser. No. 07/834,604, filed Feb. 12, 1992, and assigned to the assignee hereof. This system shows a number of embodiments of induction systems wherein there is provided a control valve in the intake passage which is moveable between a first, opened position in which unrestricted charging is provided and wherein the charge flows into the combustion chamber in a generally axial direction for high speed running. Under low speed or mid-range performance, the control valve is moved to another position wherein the charge which enters the combustion chamber is redirected so as to increase the turbulence in the combustion chamber and also the velocity at which the charge is inducted. The turbulence is generated by introducing either a tumble and/or a swirl to the intake charge. Tumble is generally referred to as a type of swirl that occurs about an axis that extends transversely to the axis of the cylinder bore. Swirl, on the other hand, is the type of motion in which rotation occurs about an axis that is coincident with or parallel to the cylinder bore axis.

In the systems shown in that application, the position of the control valve is set in response to certain engine running parameters, normally speed and/or load. This system is extremely effective in providing good performance throughout the entire engine speed and load ranges.

However, there is another type of condition wherein modification of the amount or direction of swirl and/or tumble may be desirable. This other type of condition is a transient condition wherein the engine is not operating at a steady state condition but rather is changing its state. Examples of such transient conditions are during idle when attempts are made to stabilize idle speed, when emission control is being practiced by attempting to run on a lean mixture and to reduce nitrous oxide emissions through the use of exhaust gas recirculation (EGR) or on starting and/or cold warmup. Under these conditions, variations in the steady state position of the control valve can significantly improve performance and reduce the emission of unwanted hydrocarbons and other constituents in the exhaust gases.

It is, therefore, a principal object of this invention to provide an improved induction system and induction method for an internal combustion engine which permits good performance under all running conditions including transient conditions.

It is a further object of this invention to provide an improved induction system and method of introducing an intake charge to an engine that will improve performance under transient conditions by providing the desired amount of turbulence in the combustion chamber for the specific transient condition.

It is yet a further object of this invention to provide an improved method and apparatus for controlling the idle speed of an engine to maintain idle speed stability.

It is a still further object of this invention to provide an improved induction system and method for inducting a charge into an engine that will permit the use of increased amounts of exhaust gas recirculation for emission control.

It is a still further object of this invention to provide an improved induction system and induction method for an internal combustion engine that will improve engine performance under starting.

It is still another object of this invention to provide an improved induction system and induction method for an internal combustion engine to improve performance under cold warmup.

As has been previously noted, the use of exhaust gas recirculation is a very effective method for reducing the emission of certain exhaust gas constituents. However, all engines are sensitive, to varying degrees, to the amount of exhaust gas recirculation which they can tolerate and still maintain stable running. With convention induction systems, the EGR tolerance is such that the desired amounts of exhaust gas recirculation cannot be employed under all running conditions.

It is, therefore, a still further object of this invention to provide an improved induction system and method for introducing a charge to the combustion chamber that will permit the use of increased amounts of EGR under at least some running conditions.

SUMMARY OF THE INVENTION

A number of features of the invention are adapted to be embodied in an internal combustion engine having a pair of relatively moveable components which define a combustion chamber whose volume varies cyclically upon the relative movement of the components. An induction system is provided for introducing and charge to the combustion chamber. The induction system includes control valve means moveable between a first position wherein the charge introduced to the combustion chamber flows into the combustion chamber in a nonturbulent, substantially unrestricted condition and a second position wherein the charge enters the combustion chamber at a restricted, higher velocity and turbulent condition.

In conjunction with a first series of these features, means are provided for sensing at least one engine running condition and at least one transient condition. In accordance with an apparatus for embodying one of these features of the invention, means control the position of the control valve in response to both the sensed engine running condition and the transient condition, when it is existent. In accordance with a method for practicing this feature of the invention, the control valve is positioned in response to the sensed running condition and the sensed transient condition, if it is existent.

In connection with these features of the invention, the transient condition may be one of idle speed, the use of exhaust gas recirculation for emission control, engine starting and/or engine warmup.

Other features of the invention may be employed in conjunction with an engine that includes, in addition to those features set forth in the first paragraph of this portion of the application (Summary of the Invention) means for sensing a transient condition. In accordance with an apparatus for performing these features of the inventions, the control valve is positioned in response to the sensed transient condition by a control means. In accordance with a method for performing these features of the invention, the control valve is positioned in response to the sensed existence of the transient condition. With respect to these features of the invention, the sensed transient and condition can be idle speed, exhaust gas recirculation for emission control, cold starting and/or warmup.

The final features of the invention are adapted to be embodied in an internal combustion engine having a construction of the type set forth in the first paragraph of this portion of the specification (Summary of the Invention) and further include means for introducing exhaust gases from the exhaust system of the engine into the combustion chamber for exhaust emission control. In accordance with an engine embodying this final feature of the invention, the position of the control valve is adjusted in response to the existence of exhaust gas recirculation. In accordance with a method for practicing this final feature of the invention, the control valve is positioned in response to the existence of exhaust gas recirculation for increasing the amount of exhaust gases which can be recirculated.

DETAILED DESCRIPTION OF THE PREFERRED EMBODIMENTS OF THE INVENTION

Figure 1:
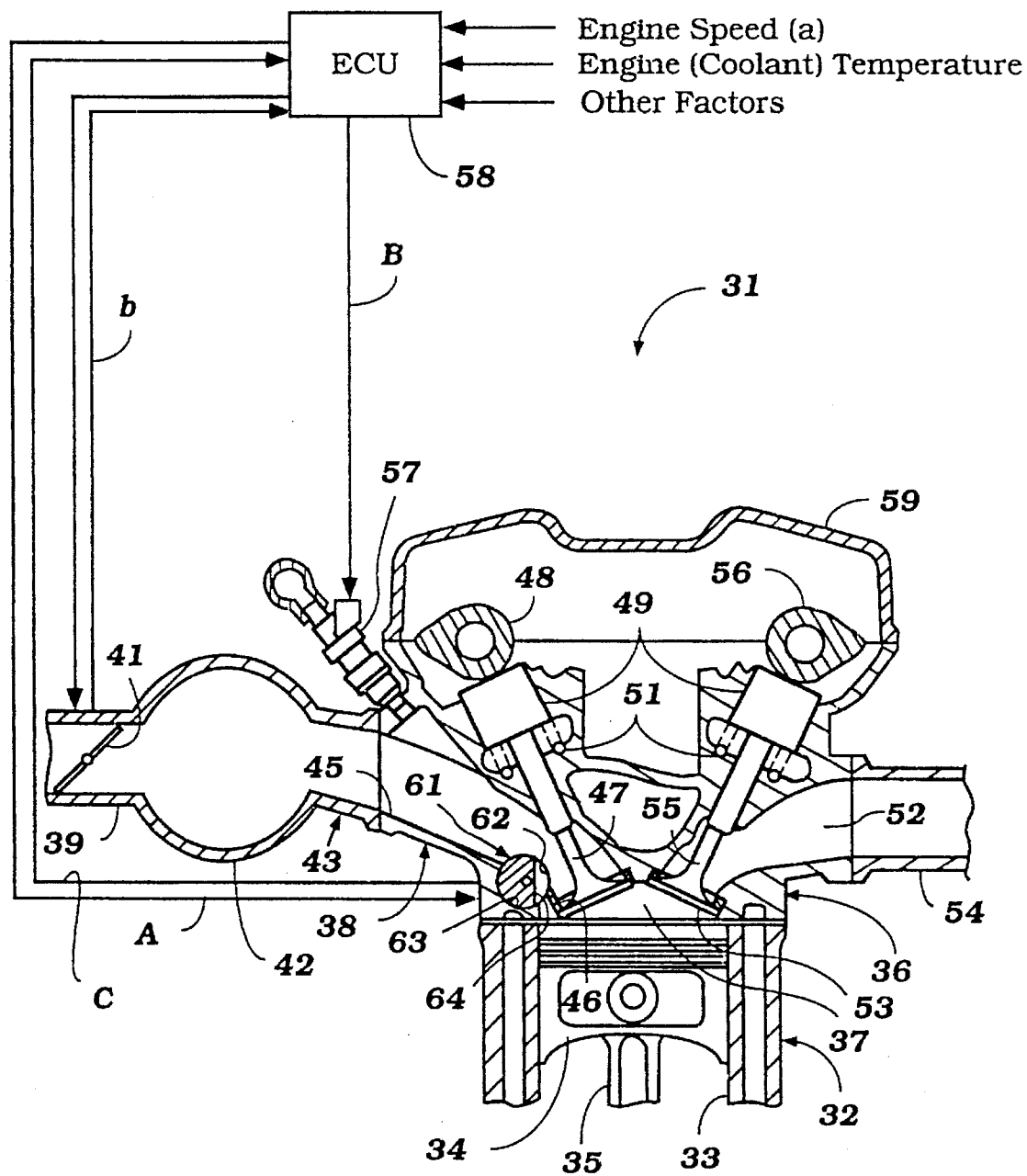
FIG. 1 is a partial cross-sectional view taken through a single cylinder of an internal combustion engine constructed and operated in accordance with certain embodiments of the invention, with portions of the system shown schematically.

Referring now in detail to the drawings and initially to FIG. 1, an internal combustion engine constructed and operated in accordance with several embodiments of the invention is shown partially and in cross section and is identified generally by the reference numeral 31. Since the invention is directed primarily to the induction system for the engine 31 and the method of inducting the charge into the engine, only the upper portion of a single cylinder of the engine has been depicted. It should be readily apparent to those skilled in the art how the invention may be practiced in conjunction with engines of varying cylinder numbers and cylinder configurations. In addition and as will become readily apparent to those skilled in the art, the invention may be also practiced in conjunction with nonreciprocating-type of engines such as rotary engines of any known type.

The engine 31 includes a cylinder block 32 that is formed with a cylinder bore 33 in which a piston 34 reciprocates in a known manner. The piston 34 is connected by means of a connecting rod 35 to a crankshaft (not shown), which is rotatably journalled in a crankcase chamber in a well-known manner so as to provide output power from the engine 31.

A cylinder head 36 is affixed in any known manner to the cylinder block 32 and is formed with a recess 37, which cooperates with the cylinder bore 33 and the head of the piston 34 so as to form the variable volume combustion chamber of the engine 31. An induction system, indicated generally by the reference numeral 38, is provided for introducing a charge to this combustion chamber.

This induction system includes an air inlet 39 in which a flow controlling throttle valve 41 is positioned. The throttle valve 41 is controlled in any known manner by an operator so as to set the running speed for the engine 31. Air is inducted to the air inlet 39 from a suitable air inlet device (not shown), which may include an air silencer and an air filter. The air from the air inlet device 39 is delivered to a plenum chamber 42 of an intake manifold, indicated generally by the reference numeral 43. This intake manifold 43 has a plurality of runners 44, each of which serves an induction passage 45 formed in the intake side of the cylinder head 36 and which terminates at a valve seat 46.

An intake valve 47 is supported for reciprocation within the cylinder head 36 in a known manner and is operated from an intake cam shaft 48 by means of a thimble-type tappet 49 that is supported for reciprocation within the cylinder head 36 in a known manner and which is associated with the stem of the intake valve 47. There is also provided a return spring assembly 51 for urging the intake valves 47 to their closed position, as is well known in this art. The intake cam shaft 48 is driven at one-half crankshaft speed by any type of drive mechanism.

An exhaust passage 52 is formed in the side of the cylinder head 36 opposite the intake passage 45 and extends from a valve seat 53 in the cylinder head 36, which communicates with the combustion chamber 37 to an exhaust manifold 54 that discharges the exhaust gases to the atmosphere through any suitable exhaust system (not shown).

An exhaust valve 55 is supported for reciprocation within the cylinder head 36 in a known manner and is opened by an exhaust cam shaft 56, which is suitably journalled in the cylinder head 36 and which operates the exhaust valve 56 through a thimble tappet 49, which is also slidably supported in the cylinder head assembly 36 in a known manner. A valve spring 51 urges the exhaust valve 55 to its closed position.

A fuel injector 57 is supported in the cylinder head 36 in a known manner and injects fuel into the intake passage 45. In the illustrated embodiment, the fuel injector 57 is of the electrically operated type and is opened and closed by an electronic control unit (ECU), indicated generally by the reference numeral 58 and shown schematically in this figure, with further details of its components being shown in FIG. 2, which will be referred to subsequently. The ECU 58 receives signals from a number of sensors indicative of engine conditions such as engine speed a, engine temperature (coolant temperature) b, and other conditions in order to practice certain embodiments of the invention, as will be described. Any known type of control routine may be employed for controlling the normal engine operating condition of the fuel injector 57, and this may include various other types of known sensors such as sensors that determine intake air volume and/or temperature, as indicated at b, which may also be determined by a throttle position sensor.

The valve mechanism as thus far described, including the intake and exhaust cam shafts 48 and 56, is enclosed by a cam cover 59 that is affixed to the cylinder head 36 in any known manner.

The construction of the engine 31 as thus far described may be considered to be conventional and, for that reason, any details of the engine construction which are not illustrated may be of any type well known in the art. In accordance with the invention, the induction system as thus far described, including the intake passages 45, is configured so that the charge that enters the combustion chamber 37 will be substantially unrestricted and will flow in a generally axial direction so as to not generate any turbulence in the combustion chamber. As is well known, this provides very effective and efficient charging efficiency, but will not provide optimum running under low engine speeds and load. Therefore, and in accordance with the invention, a control valve, indicated generally by the reference numeral 61, is provided in the induction system 43 for generating turbulence in the combustion chambers 37 and restricting the flow through the induction system 43 to increase the flow velocity under certain running conditions. This control valve 61 is mounted in a transversely extending bore 62 formed in the cylinder head 36 and includes a valving portion 63 that is provided with a cutout 64 so as to redirect the flow into the combustion chamber when in its closed positions, including the fully closed position as shown in FIG. 1. The construction of the control valve 61 may be of any of the types disclosed in the aforenoted copending application Ser. No. 07/834,604, the disclosure of which is incorporated herein by reference. The control valve 61 in its closed position may generate either tumble, swirl, or a combination of both, depending upon which type of construction from the aforenoted application is employed. Said another way, the control strategies, which will be described herein, can be employed with any of the types of control valves shown in the aforenoted copending application and any other type of control valve that is designed so as to provide turbulence and increase in velocity of induction charge under some running conditions and substantially unrestricted flow under other running conditions.

The position of the control valve 61 is controlled by a servo motor (not shown) and which receives a control signal A from the ECU 58 in conjunction with control strategies of the type that will be described. In addition, a position sensor outputs a signal c back to the ECU 58 so as the ECU 58 can monitor the actual position of the control valve 61 for the control routines that will be employed.

Figure 2:
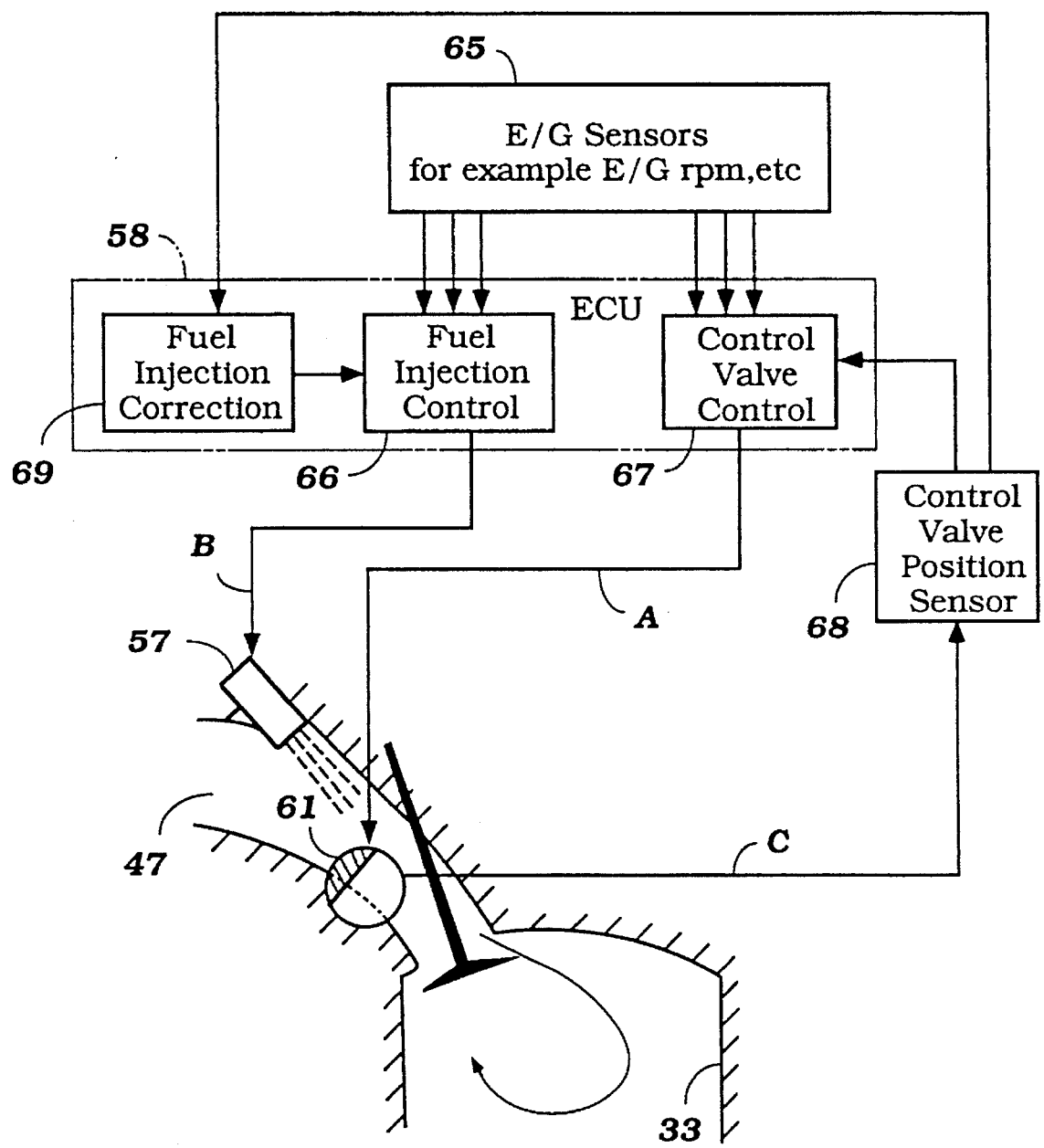
FIG. 2 is a view, in part similar to FIG. 1, and shows further details of the control system and for correcting the amounts of fuel injected in response to certain transient conditions.

Referring now to FIG. 2, this shows in more detail the components of the ECU 58 and their interrelationship to the control valve 61 and the fuel injector 57. The ECU 58, as has been noted, receives certain signals from engine condition sensors, and these sensors are indicated as a block at 65 and may include sensors that sense engine speed, throttle valve position or load, etc. The ECU 58 has an injection control block 66 that provides the control signal B to the fuel injector 57 for controlling not only the initiation but also the timing of fuel injection. In addition, there is a control valve control block 67 that outputs the signal A to the intake control valve 61 for controlling its position. The signal c, indicative of the position of the control valve 61, is provided by a position sensor, indicated schematically at 68 in FIG. 2. In addition, and in accordance with certain embodiments of the invention, the amount of fuel injected from the normal requirements for given running conditions may be adjusted by a correction section 69, which can correct for certain conditions, as will be hereinafter noted.

It is to be understood that the basic control routine for controlling the position of the control valve 61 and the amount and duration of fuel injected by the fuel injector 57 may be varied by any known control routine. Those of the control valve 61 may be as set forth in the aforenoted copending application Ser. No. 07/834,604. This invention deals primarily with the accommodation of certain transient conditions and the control of the engine in response to those transient conditions, and one of those transient conditions is the maintenance of the desired target idle speed. As is well known, various conditions can cause the idle speed of the engine to vary. Conventionally, the idle speed may be stabilized by adjusting things such as spark timing and/or throttle valve position or bypass air flow around the throttle valve so as to maintain a stabilized idle speed. In accordance with a feature of this invention, the idle speed can be stabilized by changing the position of the control valve 61.

The reason idle speed can be maintained by adjusting the position of the control valve 61 is that the control valve 61 varies the degree of turbulence created in the combustion chamber, depending upon its position. That is, the further the degree of movement of the control valve 61 toward its fully closed position, as shown in FIG. 1, will determine the amount of turbulence induced. As the turbulence increases, flame propagation in the combustion chamber 37 will increase. Therefore, all other factors being held equal and considered normal, it is possible to increase the idle speed of the engine by closing the control valve and decreasing the idle speed by opening of the control valve.

Figure 3:
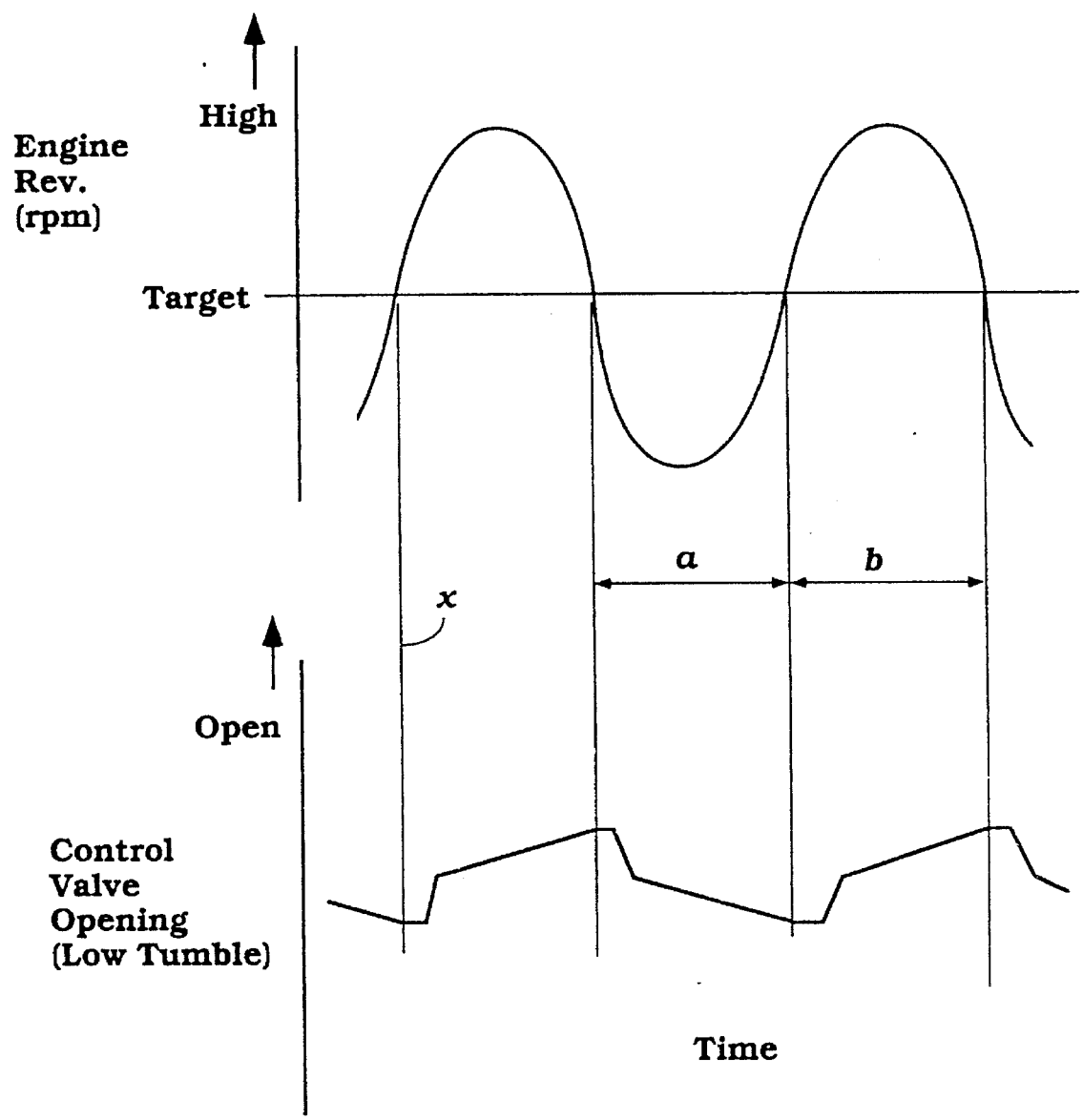
FIG. 3 is a graphical view showing how the idling speed can be stabilized in accordance with a first embodiment of the invention and depicts the engine speed in RPM in relation to time and also the position of the induction system control valve in order to stabilize idle speed.
Figure 4:
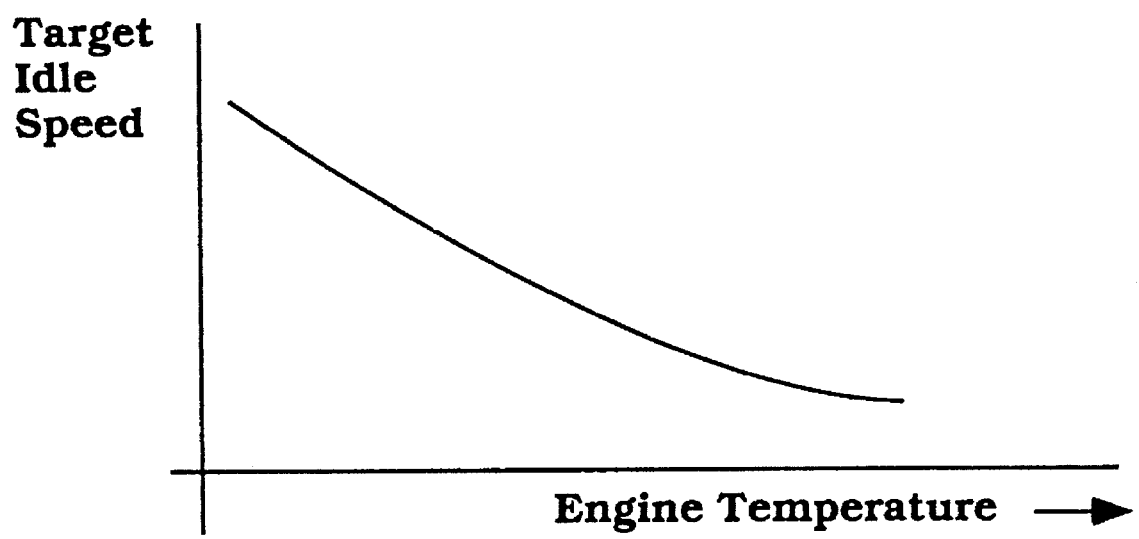
FIG. 4 is a graphical view showing the target idle speed in response to engine operating temperature.

FIG. 3 shows how this can be accomplished, with the top view showing the variation of engine idle speed from target speed in response to time and the lower curve showing the position of the control valve 61 in response to the sensed engine speed so as to maintain the desired idle speed. FIG. 4 is a graphical view showing the target idle speed in relation to engine temperature. The target idle speed is maintained higher when the engine is cold and is reduced to normal idle speed as the engine reaches its operating temperature.

Referring now specifically to FIG. 3, at point X the target idle speed is maintained; but as the time increases, the actual speed of the engine may increase above target idle speed due to varying factors. In order to reduce the speed, the control valve 61 is rotated from a partially closed position, as shown in FIG. 1, which is the normal idle position under most control routines, toward an open position so as to reduce turbulence, which, as aforenoted, may be either tumble, swirl, or a combination of them. This opening continues until the engine speed returns to the target idle speed. At this time the control valve 61 will then be returned to the normal idle speed setting. If, however, during the time period a the idle speed then decreases from the target idle speed, the control valve is moved from the idle position toward a more fully closed position so as to increase the tumble action and turbulence, and accordingly increase the speed of the engine. This occurs until the time a has elapsed and target speed is again reached. The time period b shows an increase in target idle speed due to variables and the return back to the target idle speed by again opening the control valve 61 from the idle position so as to decrease turbulence and reduce engine speed.

Figure 5:
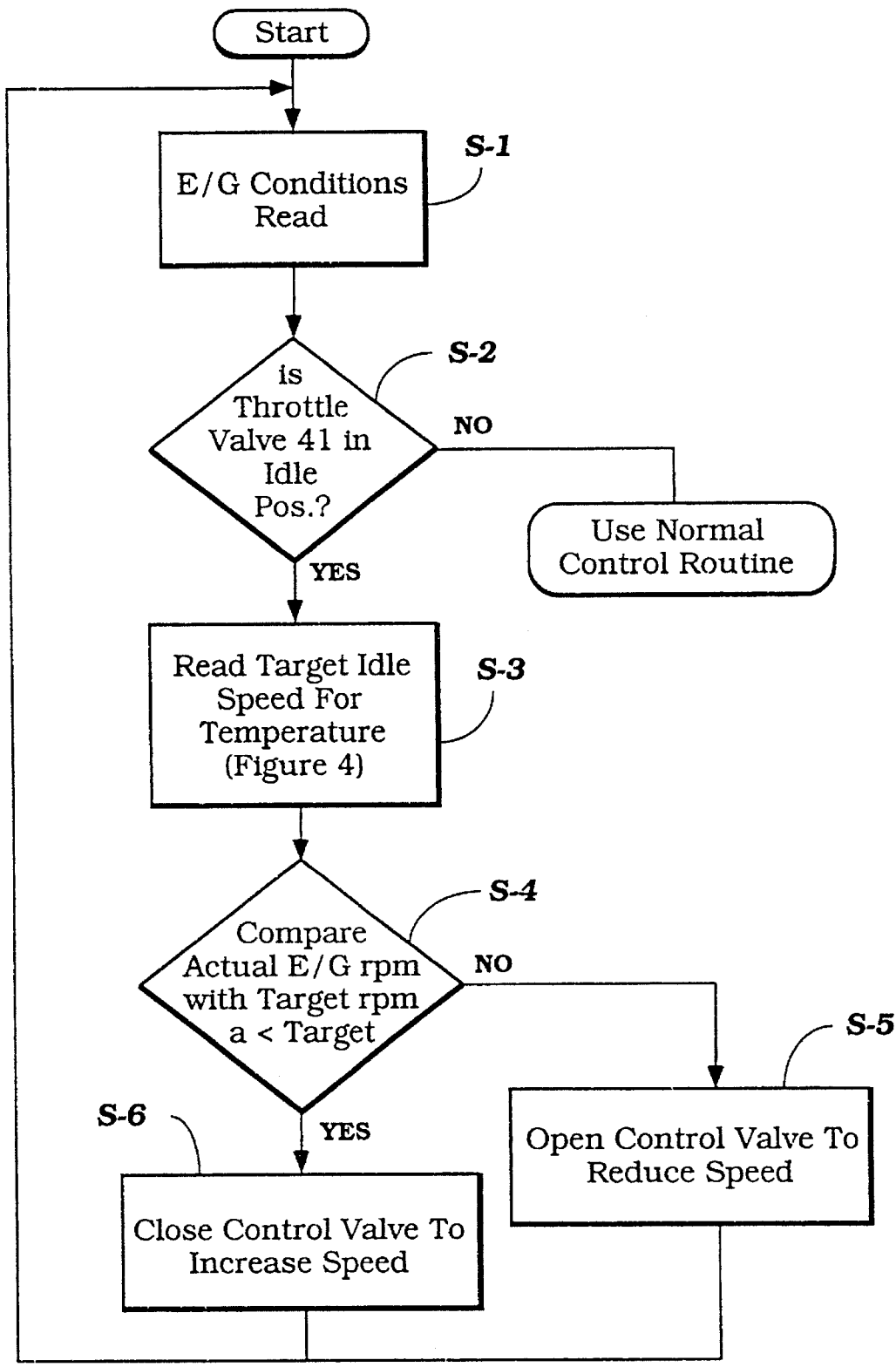
FIG. 5 is a block diagram showing the control routine for maintaining target idle speed by employing the induction system control valve in accordance with this first embodiment of the invention.

FIG. 5 is a block diagram showing the control routine for the ECU 58 so as to achieve the aforenoted result. This program is a subroutine of any conventional control routine for controlling the position of the control valve 61, as aforenoted. Referring to FIG. 5, when the subroutine starts, the program moves to the step S1 so as to read the engine conditions, including engine temperature and actual engine speed. The program then moves to the step S2 so as to determine if an idle switch (which may be the throttle position switch) indicates that the throttle valve 41 is in its idle position. If it is not, the program moves to the normal control routine.

If, however, it is determined at the step S2 that the idle switch indicates that the throttle valve 41 is in its idle position (again, this can be determined merely by the throttle position sensor), the program moves to the step S3. At the step S3, the desired engine idle speed or target engine idle speed is determined in response to engine operating temperature from the curve of FIG. 4.

The program then moves to the step S4 to compare the actual engine speed with the target idle speed. A determination is made at the step S4 to determine if the actual speed is lower than the target idle speed.

If, at the step S4, it is determined that the actual idle speed is not lower than the target idle speed, then the program moves to the step S5 so as to cause the control valve 61 to be rotated toward its open position and reduce the turbulence. The program then repeats back to the step S1.

If, however, at the step S4 it has been determined that the actual engine speed is lower than the desired engine speed, then it is necessary to increase the turbulence in the combustion chamber by closing the control valve 61 from its present position, and this is done at the step S6.

An embodiment of the invention that is particularly adapted for use with engines having exhaust gas recirculation for permitting lean burn operation and still maintaining good $NO_x$ control will be described by reference to FIGS. 6–15. This embodiment modifies the construction of the basic engine, as shown in FIG. 1, to include an EGR system. This EGR system is indicated generally by the reference numeral 71 and includes a conduit 72 that extends from the exhaust manifold 54 back to the induction system (in this embodiment the induction system plenum chamber 42). An EGR control valve, indicated generally by the reference numeral 73, is positioned in this conduit 72, and this EGR valve 73 includes a valve element 74, which is movable from a closed position in which no EGR is permitted toward an opened position in an amount of lift or opening determined by a servo motor 75, which may be a stepper motor that is opened and closed in response to a signal D from the ECU 58 in response to any normal control routine upon which is superimposed the control routine to interrelate it with the induction control valve 61 in the manner which will be described. By employing this EGR system, including the control valve 61, it is possible to employ a substantially greater amount of exhaust gas recirculation at substantially all engine loads without introducing instability in running, and thus permit lean burn operation.

Figure 7:
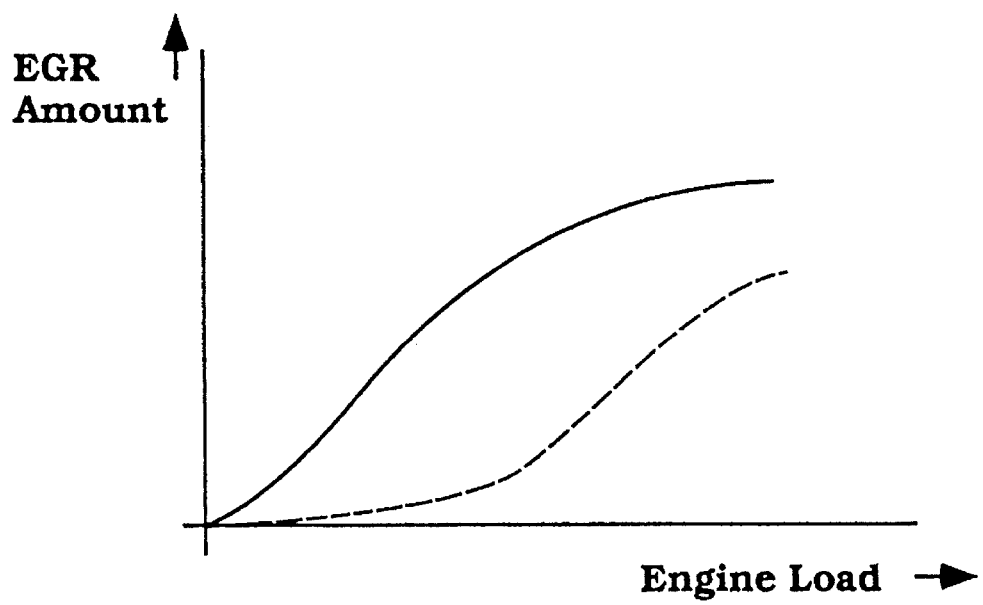
FIG. 7 is a graphical view showing the relationship of amount of exhaust gas recirculation in response to engine load for an engine embodying the invention (solid-line curve) and one not embodying the invention (broken-line curve).

This may be best understood by reference to FIG. 7, which shows the actual EGR amount permissible for stable running in relation to engine load with the use of the control valve 61, as shown in the solid-line curve, and without the use of the control valve, as shown in the broken-line curve. It will be seen that substantially greater amounts of exhaust gas recirculation are possible, and hence lean burning and still good $NO_x$ control are possible with this system.

Figure 8:
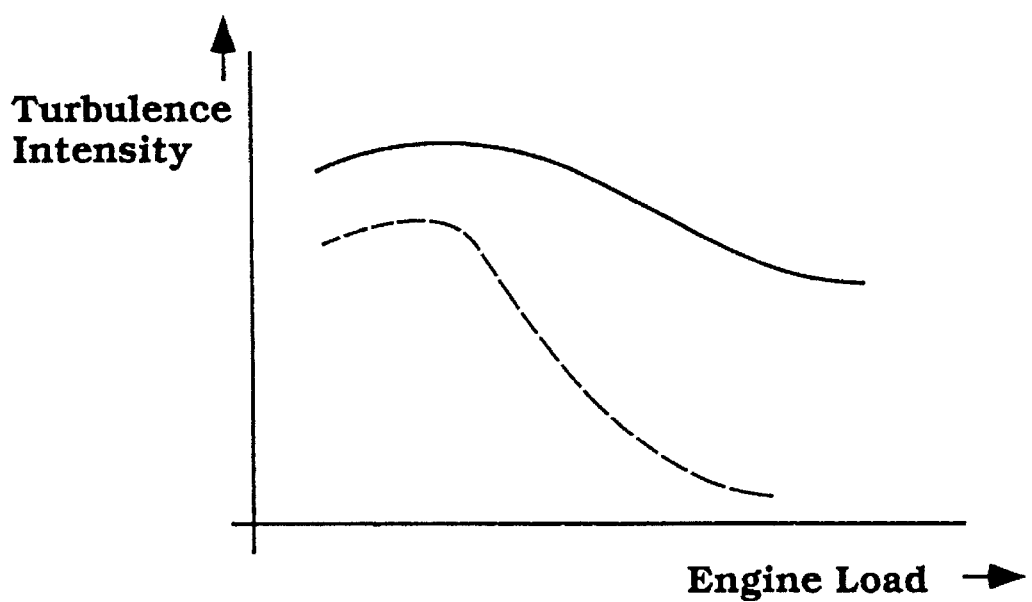
FIG. 8 is a graphical view showing the relationship of turbulence intensity in relation to engine load in an engine without exhaust gas recirculation (broken-line curve) and with exhaust gas recirculation (solid-line curve).

FIG. 8 shows the optimum amount of turbulence intensity in the combustion chamber in response to load both with and without EGR. It will be seen that with EGR, as shown in the solid-line curve, tumble intensity should be increased so as to maintain stable engine running.

Figure 9:
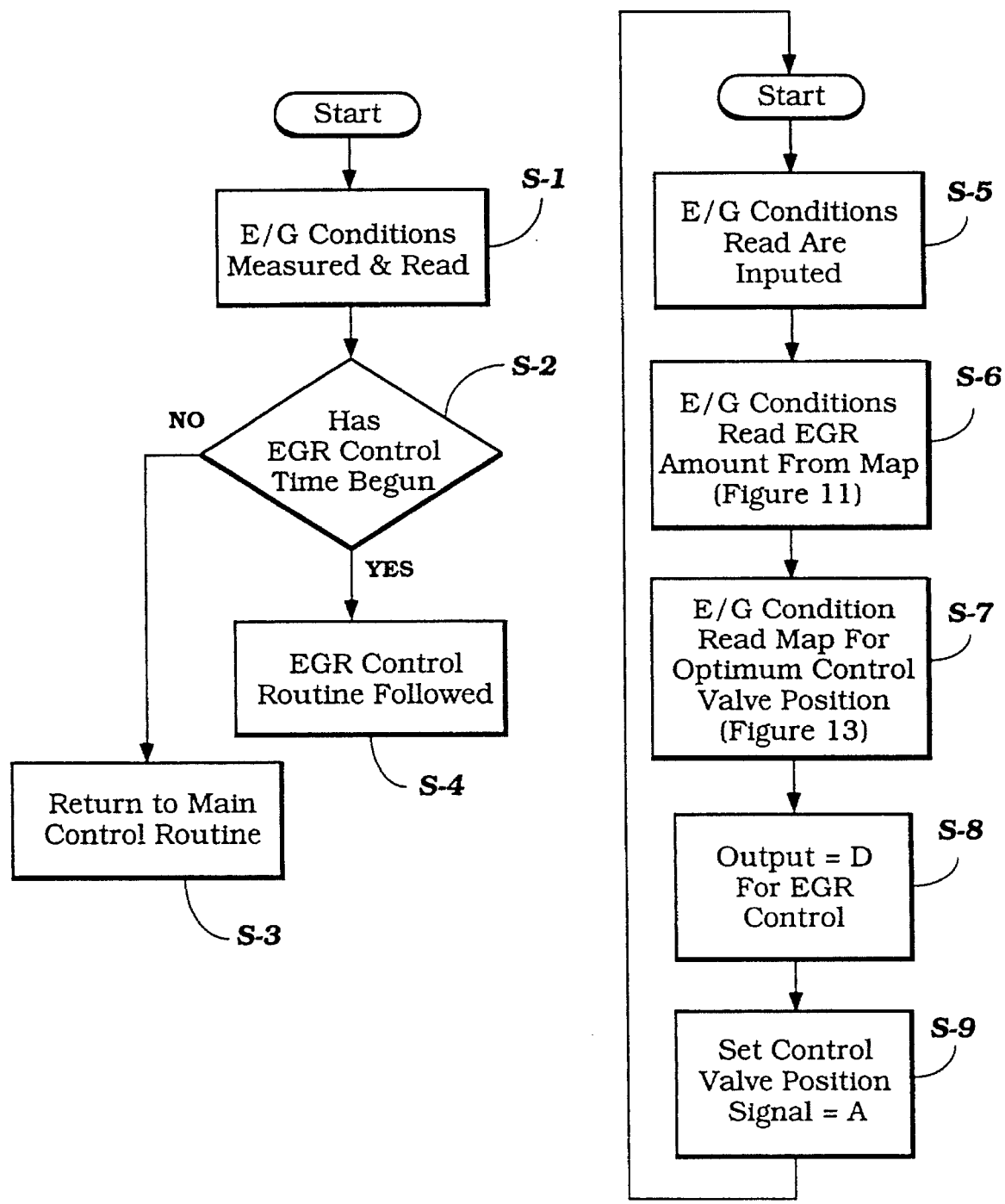
FIG. 9 is a block diagram of a first control routine for practicing the embodiment of the invention incorporating exhaust gas recirculation.

The control routine for this system may be best understood by reference to FIG. 9, which shows a first embodiment or control routine. Again, this control routine is based upon a subcontrol routine that will be employed in conjunction with any known type. It should be noted that this control routine is intended to be performed only in finite time intervals and not continuously. Of course, these time intervals are very small and expressed in milliseconds. Therefore, when the program begins and moves to the step S1, certain engine conditions are continuously monitored, for example the engine speed and temperature and other factors are read. The program then moves to the step S2 to determine if the time for effecting EGR control has begun. If it has not, the program moves to the step S3 so as to go back to the main control routine.

If, however, at the step S2 it is determined that the time has elapsed for effecting an EGR control, the program moves to the step S4 so as to actually output the control signal in accordance with the subroutine, as shown to the right hand side of FIG. 9.

Figure 11:
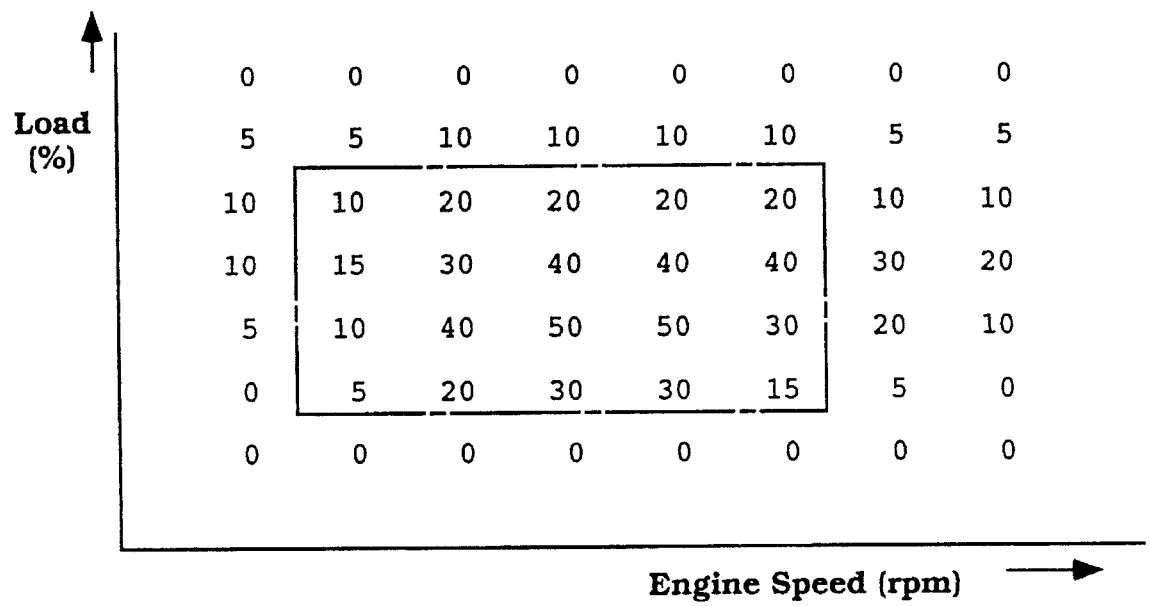
FIG. 11 is a map showing the amount of opening of the exhaust gas recirculation valve (lift) in relation to engine speed and load.

In this subcontrol routine, once the program has started, it moves to the step S5 so as to determine the read engine conditions at this time (the step S1). The program then moves to the step S6 so as to decide the correct amount of EGR for the conditions as set forth in a map, as shown in FIG. 11. These conditions are engine speed and load as a percent of maximum load from minimum load. The area in FIG. 11, encompassed by the dot-dash line, is the area where the control valve 61 provides maximum effect. The number represents the EGR amount in valve lift in tenths of a millimeter; i.e., ten equals one millimeter.

Figure 6:
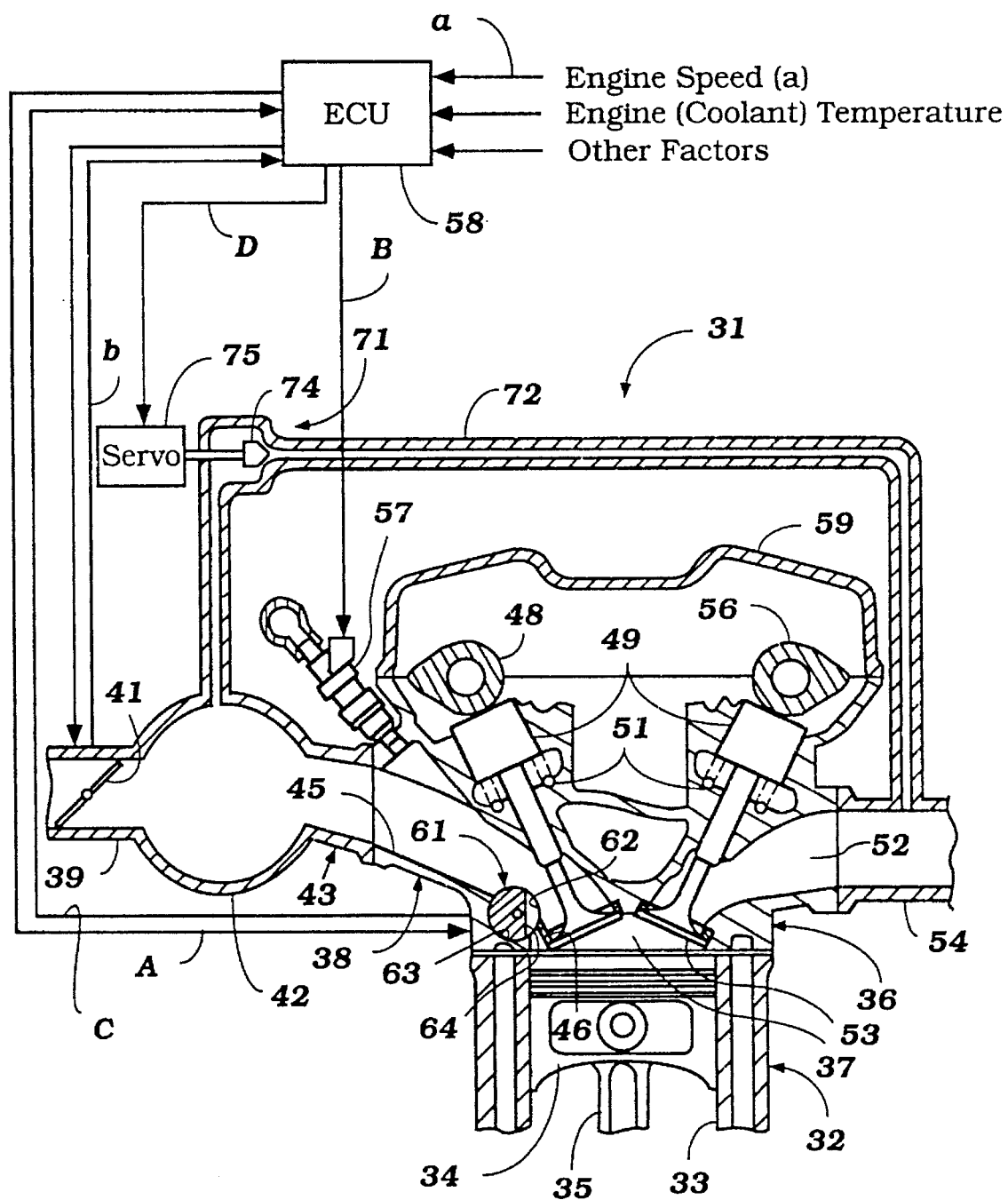
FIG. 6 is a cross-sectional view, in part similar to FIG. 1, and shows an embodiment utilizing exhaust gas recirculation (EGR).
Figure 13:
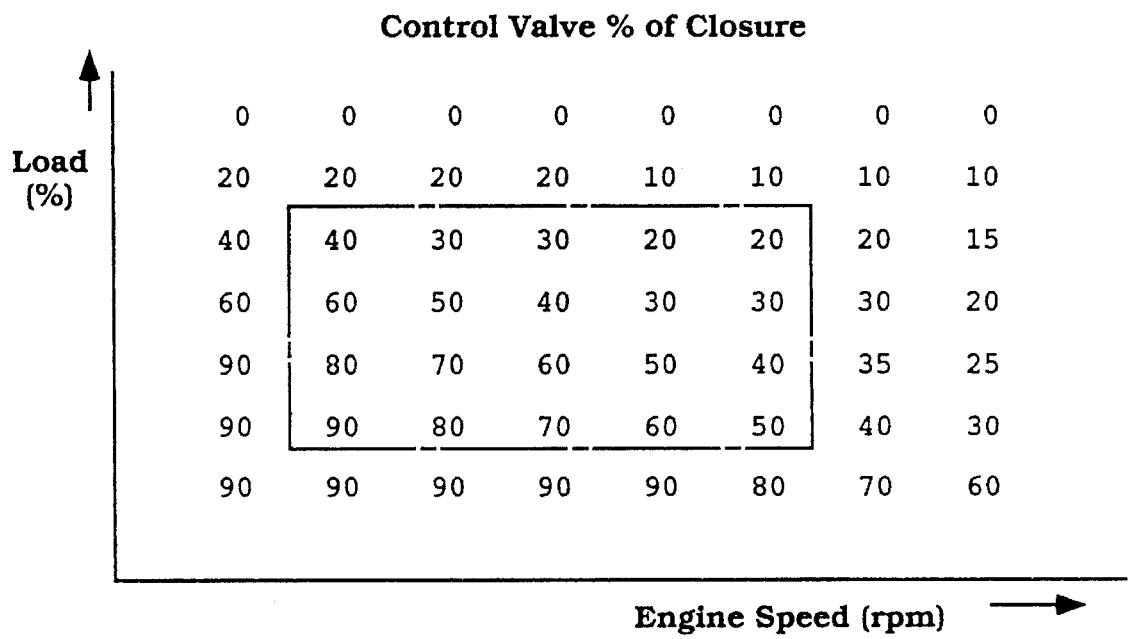
FIG. 13 is a map showing the degree of closure angle of the control valve in relation to engine speed and load when embodying EGR.

The program then moves to the step S7 so as to read the optimum or desired position of the control valve, again being determined by the map of FIG. 13. In this map the engine speed and engine load are plotted against the degree of closing of the control valve 61, with 100 percent being the full closed position as shown in FIGS. 1 and 6.

Once these figures are read, then the program moves to the step S8 so as to output the signal D to the EGR valve 73 so as to provide its desired degree of lift and to the step S9 so as to output the control signal A to the control valve 61 so as to set its desired degree of closure.

Figure 12:
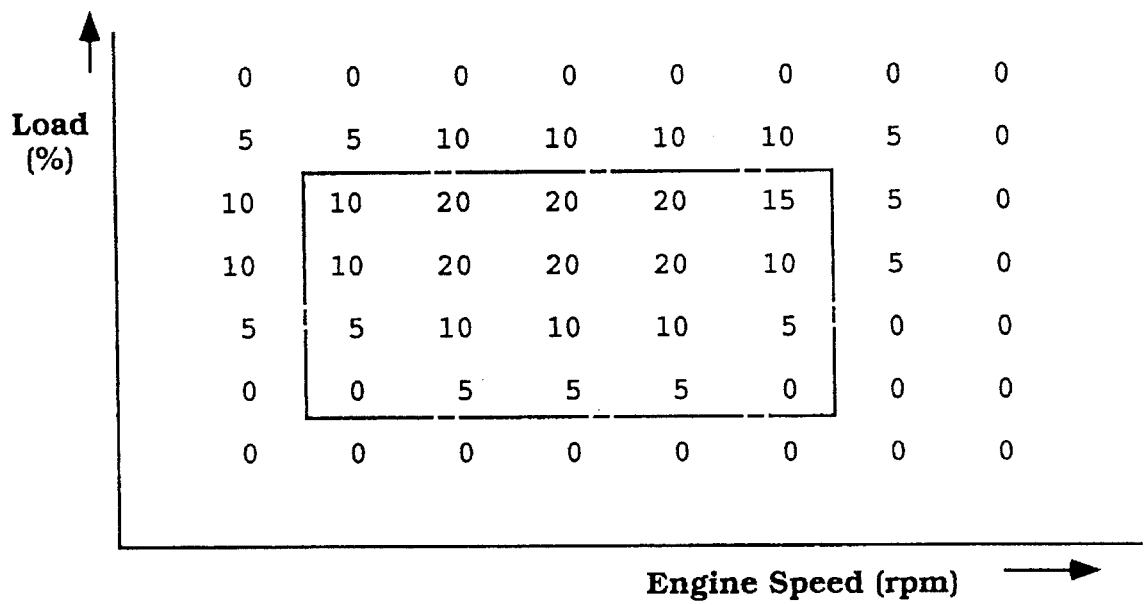
FIG. 12 is a map, in part similar to FIG. 11, and shows the relationship of the amount of EGR valve lift in response to load and engine speed with prior art types of constructions not employing the invention.

FIG. 11 should be compared with FIG. 12 in that FIG. 11 shows a conventional prior art type of system indicating the amount of EGR determined by valve lift in response to engine speed and engine load, this being a system without the type of control valve as shown herein. It will be noted that under many conditions the amount of EGR can be substantially increased, particularly in the desired control range, as shown in the dot-dash-line curve, this being the condition under most normal running conditions.

Figure 14:
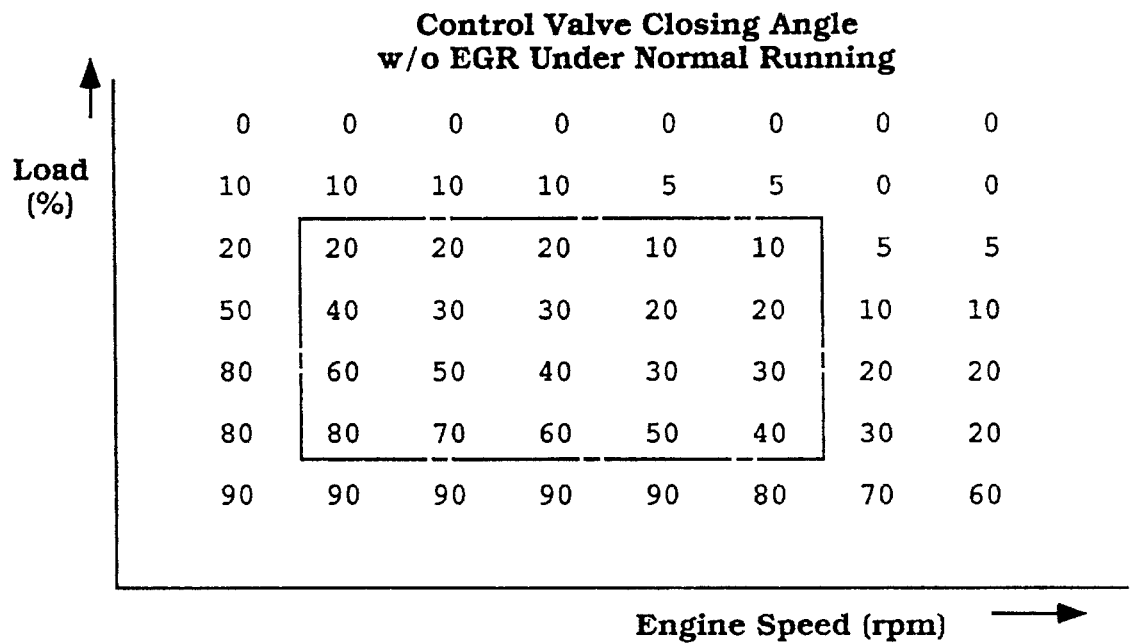
FIG. 14 is a graph, in part similar to FIG. 13, and shows the degree of closing of the control valve in an engine not embodying EGR.

FIG. 14 should be compared with FIG. 13, as this shows the position of the control valve 61 in a system without EGR, and thus without the advantages of EGR but still incorporating the advantages of the use of the control valve 61 so as to increase turbulence. Again, it should be noted that the control valve 61 is more fully closed under most conditions than when EGR is not employed.

Referring to FIG. 6 again, it will be noted that the EGR system introduces the exhaust gases to the induction system at a point upstream from the control valve 61 and from the combustion chamber 37. Hence, once the position of the EGR valve 73 is changed, there will be some time delay before the effect of this changed condition is realized in proximity to the control valve 61 and the combustion chamber 37. Hence, if the control valve 61 is operated simultaneously with the EGR valve, this can cause less than optimum performance because of this time delay. This time delay is only significant if the amount of EGR provided is less than that previously present. That is, the time delay is only significant under conditions when the amount of EGR is being reduced.

Figure 10:
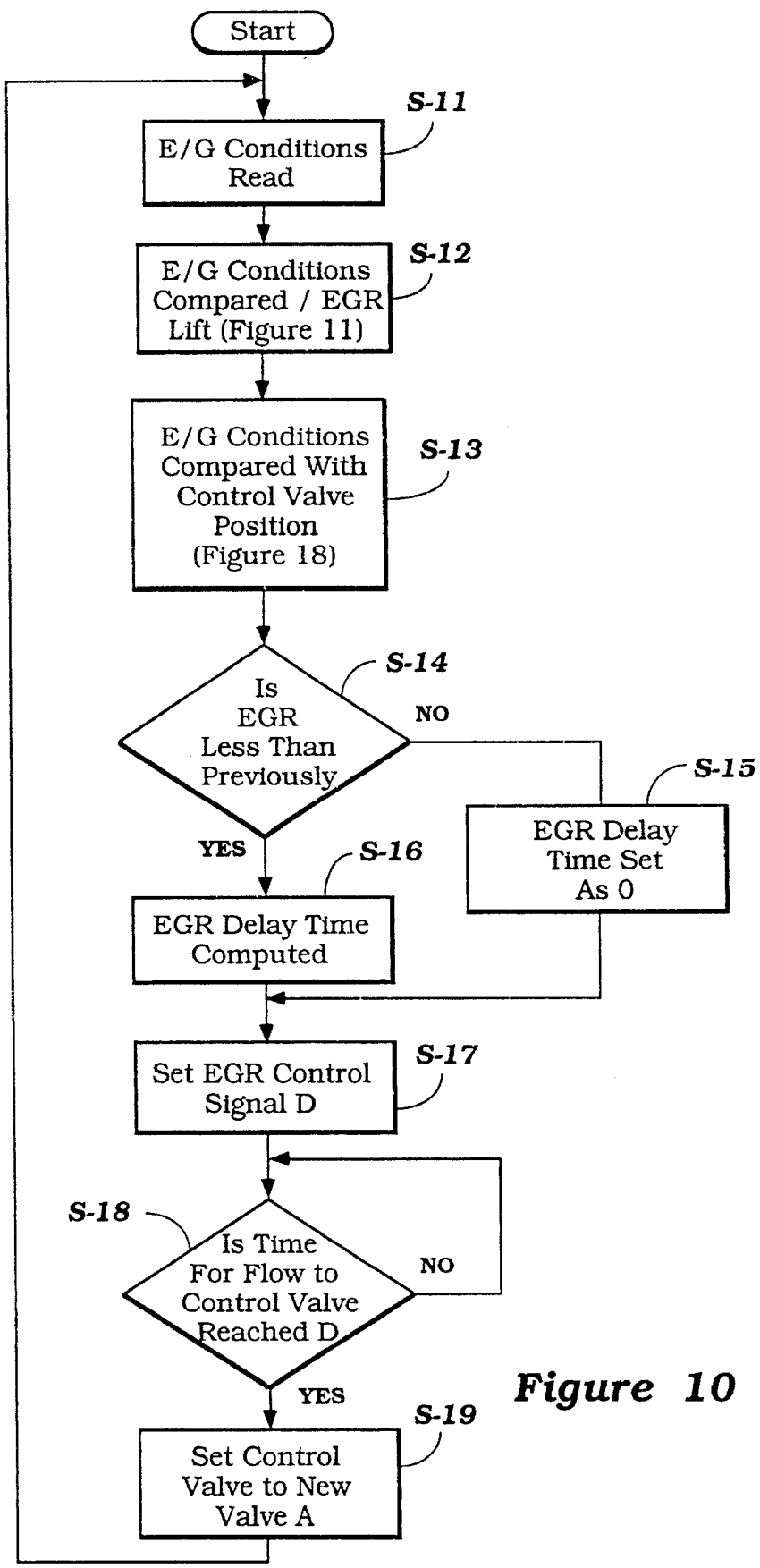
FIG. 10 is a block diagram of another control routine that may be employed in conjunction with this embodiment so as to compensate for the delay of effect of the exhaust gas recirculation in the combustion chamber due to the displacement of the point where exhaust gases are introduced from the control valve and the combustion chamber.

FIG. 10 shows a control routine that may be employed so as to reflect this time delay so as to provide optimum performance. This control routine may be employed as a subcontrol routine along with the control routine of FIG. 9. Referring specifically to FIG. 10, when the program starts, it moves to the step S11 so as to read the engine conditions, the same as the step S5 in FIG. 9. The program then moves to the step S12 so as to read the desired or optimum amount of EGR valve lift from the map of FIG. 11, again the same as the step S6 from FIG. 9. The program then moves to the step S13 so as to read from the map of FIG. 13 the optimum position of closure for the control valve 61 (the same as the step S7 of FIG. 9).

In accordance with this embodiment, rather than then outputting the control signal as at the steps S8 and S9 of FIG. 9, the program moves to the step S14 to determine if the amount of EGR valve lift is less than that of the previous step. If it is not, the program moves to the step S15 so as to set the EGR delay time as 0. This delay time is the time at which it will take the exhaust gasses to reach the control valve 61 from the EGR valve 73.

If, however, at the step S14 it is determined that the amount of EGR is less than that of the previous step, then the program moves to the step S16 so as to determine the delay time for the exhaust gasses to reach the control valve 61.

The program then moves to the step S17 so as to set the control signal D for the EGR valve 73 and specifically at stepping motor 75 so as to close it to the new amount.

The program then moves to the step S18 so as to begin a counting and determine if the time which is elapsed is sufficient for the changed or reduced amount of exhaust gases to have reached the control valve 61. If it has not, the program repeats. If, however, the time has run out at the step S18 and this time will indicate that the reduced amount of exhaust gases will be present at the control valve 61, then the control valve 61 is set by the signal A to the new position determined by the reduced amount of EGR at the step S19.

Figure 15:
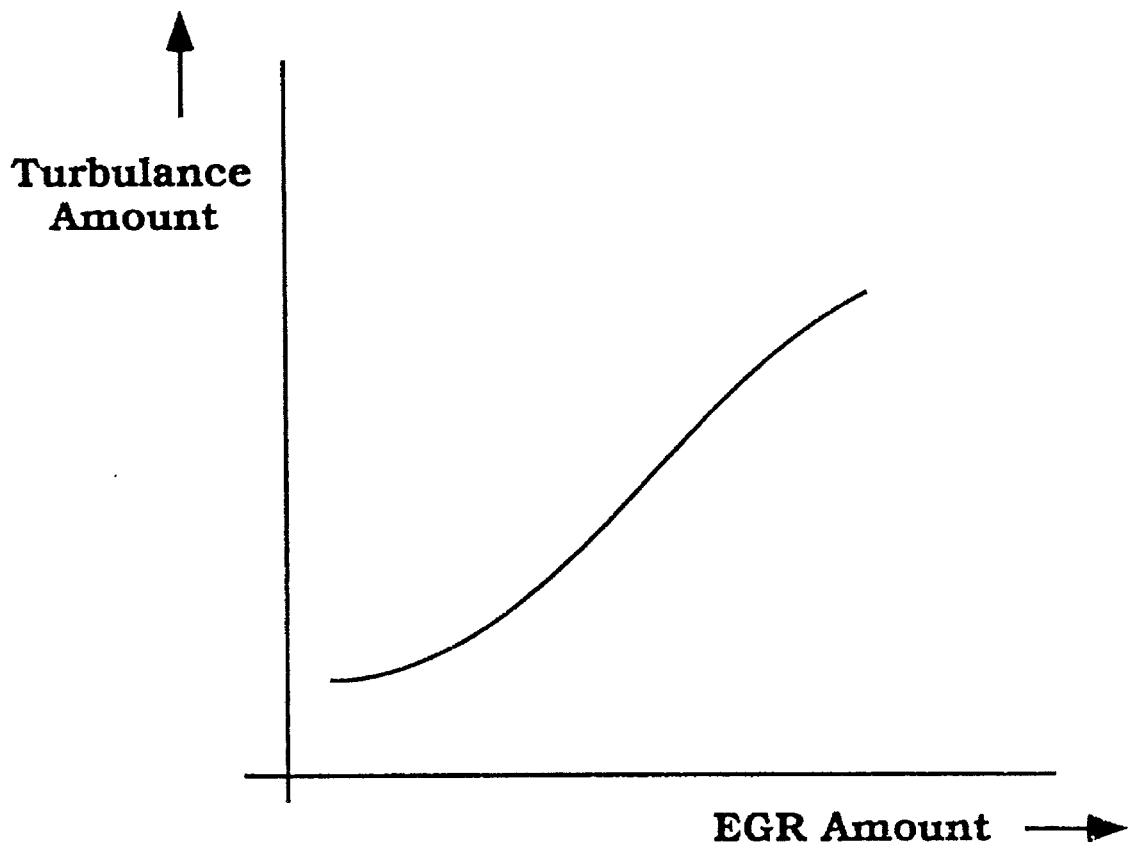
FIG. 15 is a graphical view showing the degree of turbulence relative to the amount of exhaust gas recirculation in a simple control system in accordance with this embodiment of the invention without employing maps.

In the routines as thus far described, it has been assumed that the optimum position of both the control valve 61 and the EGR valve 73 are determined by the respective maps of FIGS. 11 and 13. It is also possible to utilize this concept in conjunction with a simpler program that does not employ maps, and FIG. 15 shows such an embodiment. In this embodiment, a simple curve is provided that shows the relationship between a tumble intensity (degree of tumble valve closure), in relation to EGR amount. Either control valve position or EGR amount may be determined in any known routine, and it is preferable that EGR amount is determined first and then control valve position is set from this curve.

Figure 16:
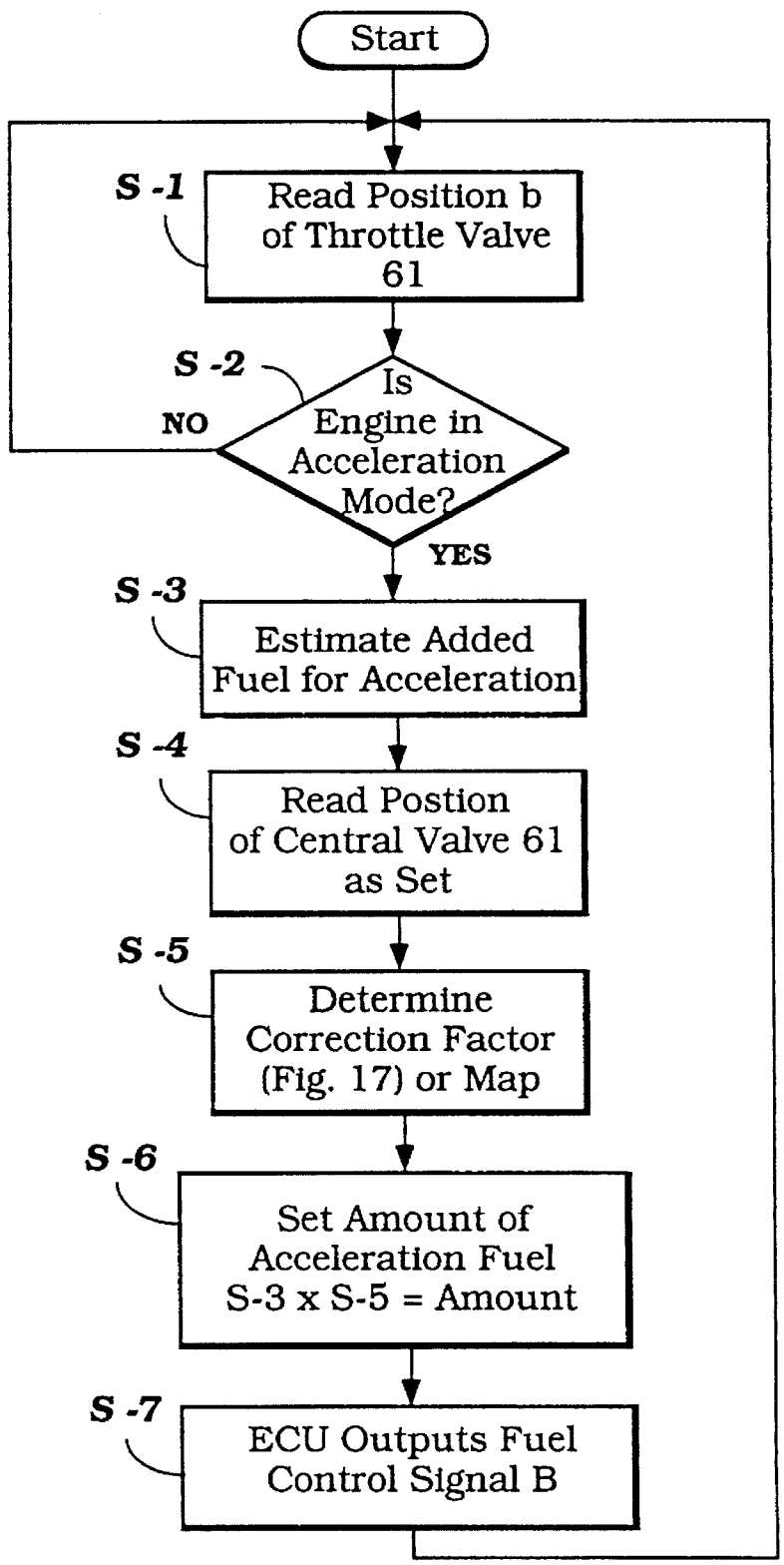
FIG. 16 is a block diagram showing a control routine employed for a transient acceleration condition.

Another transient condition wherein the effect of the control valve 61 can be considered to obtain optimum performance is under acceleration. Under acceleration, it is known that increased amounts of fuel should be supplied because of the fact that the rate of air flow changes much more rapidly than the rate of air fuel flow changes in response to this condition. However, the control valve 61 and the turbulence which it increases can diminish the tolerance toward dilution of the mixture. That is, under conditions when the control valve 61 is fully closed so as to increase turbulence, the amount of additional fuel required for acceleration can be reduced, and hence, emissions of hydrocarbons can be reduced. FIG. 16 shows a control routine for achieving this purpose. Again, this control routine can be superimposed on any conventional control routine and the other control routines already described.

Referring to the control routine of FIG. 16, the program starts and moves to the step S1 to read the actual throttle position of the throttle valve 41 from the throttle position sensor which, as aforenoted, outputs the signal b to the ECU 58. The program then moves to the step S2 to determine if the engine is operating in an acceleration mode. The acceleration condition can be determined by comparing the throttle valve position from the step S1 at a previous throttle valve position, or by determining change in intake manifold vacuum or other features indicative of acceleration. If there is no acceleration condition, the program repeats back to the step S1.

If, however, at the step S2 it is determined that there is an acceleration condition, then the program moves to the step S3 so as to determine the estimate amount of additional fuel which will be supplied under acceleration conditions. This additional amount of fuel will be determined by any known factors, such as the amount of acceleration, speed, etc.

Figure 17:
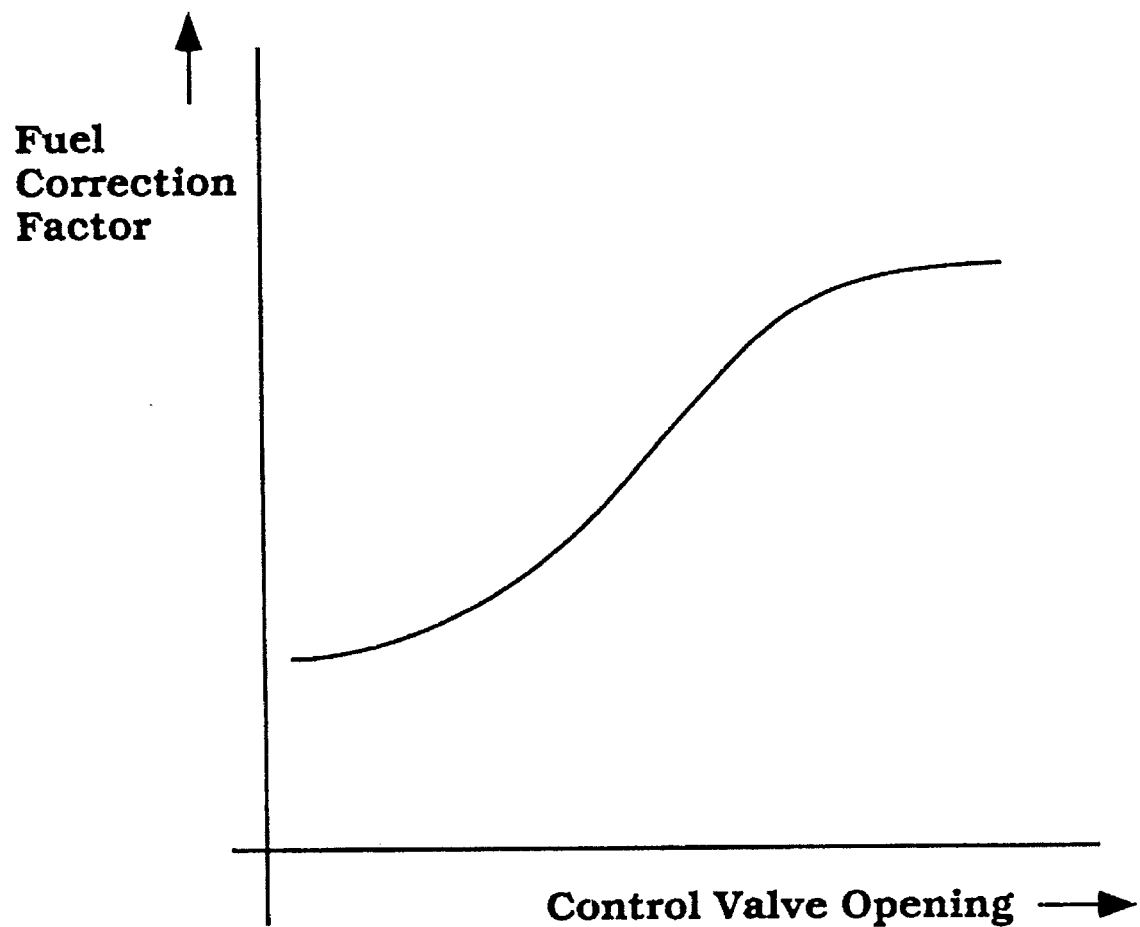
FIG. 17 is a graphical view showing the correction curve for the amount of fuel for acceleration purposes under this transient acceleration condition in relation to the position of the control valve.

The program then moves to the step S4 so as to determine the position of the control valve 61 which will have been set in response to any desired control routine based on steady-state conditions for its setting. The program then moves to the step S5 so as to determine the correction factor for the amount of acceleration fuel as determined by the position of the control valve 61 from a curve, such as that shown in FIG. 17, or map. The curve in FIG. 17 shows the correction factor in relation to the control valve position. It will be seen that when the control valve is in its closed position increasing turbulence, then the correction factor is lower, but as the control valve 61 moves toward its fully opened position, the correction factor increases.

The actual amount of acceleration fuel is then determined at the step S6, wherein the estimated amount determined at the step S3 is modified by the corrected amount determined at the step S5 to determine a final fuel injection amount. The ECU 58 then outputs the desired injection time signal at the step S7, wherein the injection control amount B is determined in response to the specific running condition and also the acceleration condition.

There is yet another and transient condition wherein the control valve 61 and the turbulence generated by it can be employed so as to improve engine running and exhaust emission control. This is a condition under extreme decelerations where the fuel is shut off under the extreme deceleration condition and then the supply of fuel is again initiated once the extreme deceleration condition is terminated.

As is well known, if fuel is continued to be supplied to the engine during deceleration, the engine operates as nothing more than a pump so as to pump this fuel from the induction system to the atmosphere through the exhaust system. Thus, many engine control systems include an arrangement for shutting off the supply of fuel to the engine under extreme deceleration. Upon resumed acceleration, or a resumption of normal engine speed, the fuel supply is again initiated.

It has been found that the amount of hydrocarbons emitted to the atmosphere can be significantly reduced by operating the control valve 61 in a manner which will be described, and interrelating the fuel control so as to improve performance under this condition. This arrangement can be best understood by reference to FIGS. 18–20.

The control routine will be described by reference to FIG. 18, with FIGS. 19 and 20 being described to show the effect of this control routine and certain correction factors which are employed in conjunction with it. Again, this control routine is actually a subroutine that can be utilized in conjunction with any conventional control and those other controls which have already been described herein. In fact, it is to be understood that each embodiment of control routine which is described herein may be employed with any other of the control routine embodiments described herein.

Figure 18:
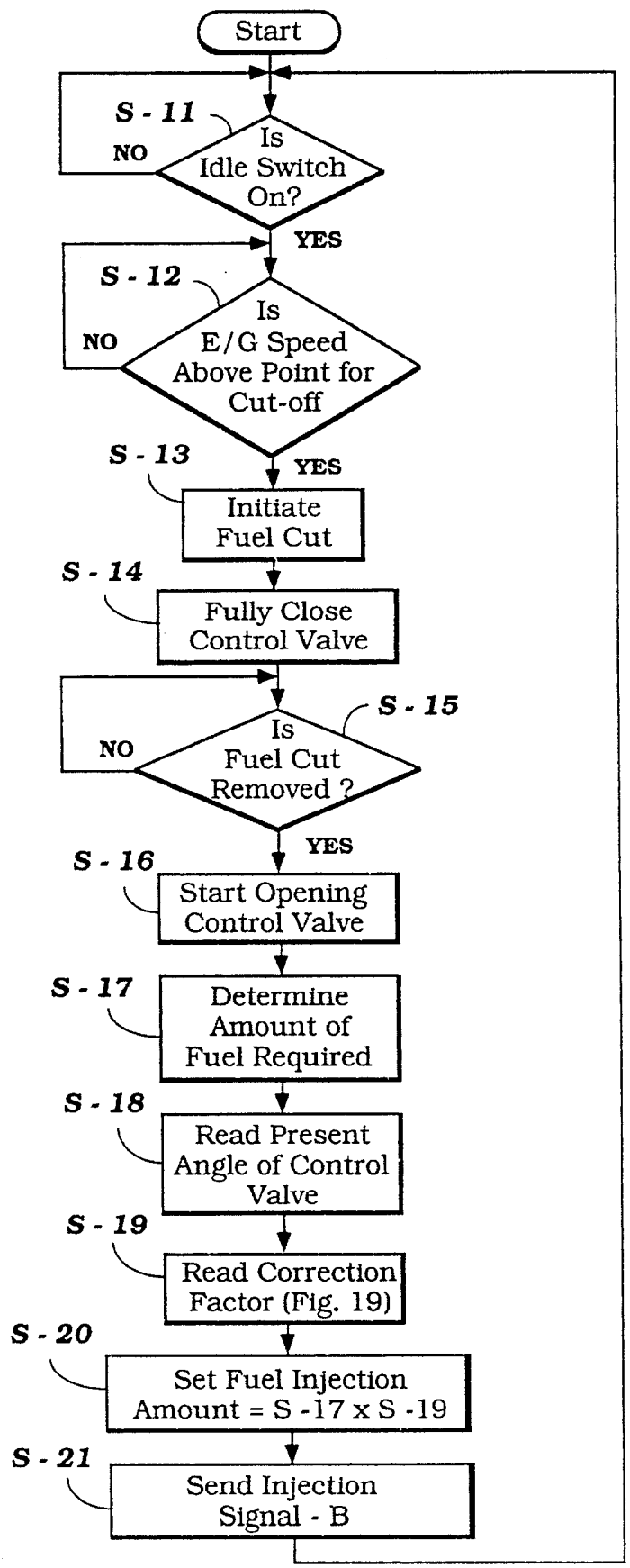
FIG. 18 is a block diagram showing the control routine in accordance with another transient condition, the resumption of fuel supply after a fuel cut-off condition during extreme deceleration.
Figure 19:
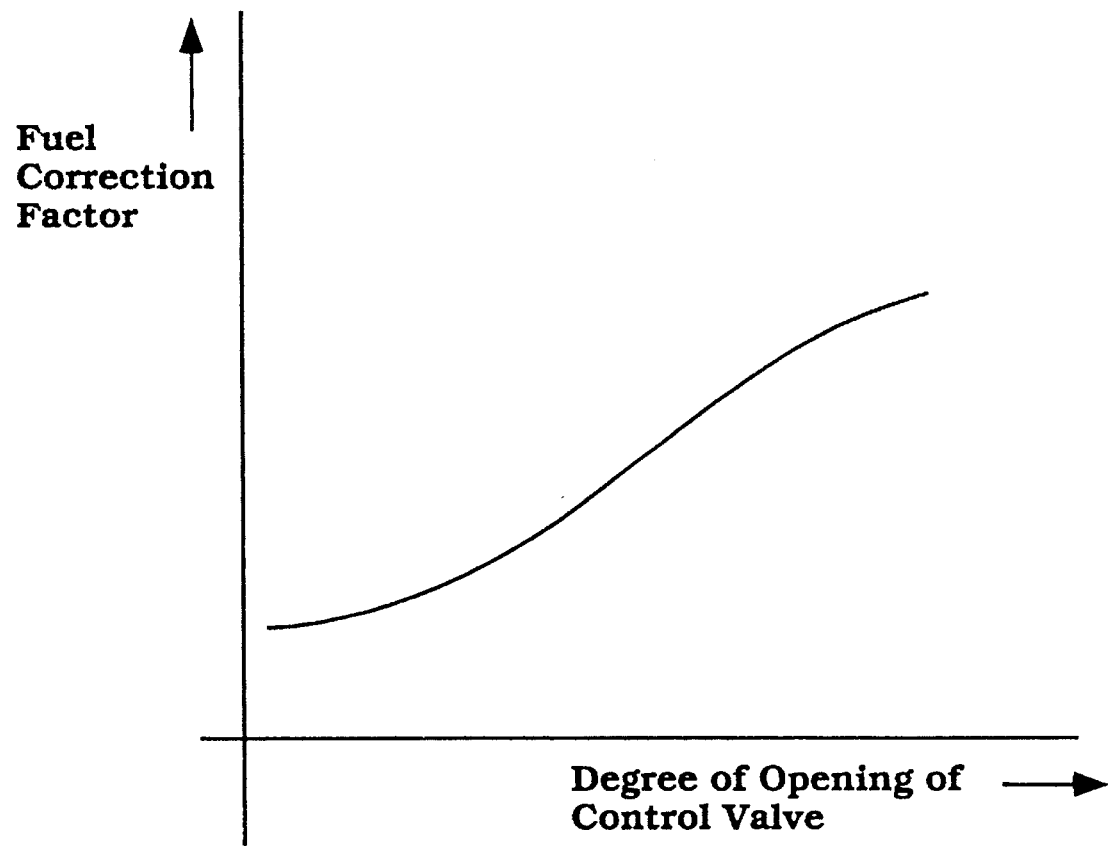
FIG. 19 is a graphical view showing the amount of correction coefficient required for the supply of fuel after cutoff has been terminated relative to the degree of opening of the control valve.

Referring to FIG. 18, the program starts, and at the step S11 determines whether the throttle valve is in its idle position, as determined either by an idle position sensor switch or the position of the throttle itself by the throttle position sensor. If the throttle valve is not in an idle condition at the step S11, it is determined that there is not a severe deceleration so as to require fuel cutoff, and the program repeats.

If, however, at the step S11 it is determined that the throttle valve 41 is in its idle position, then the program moves to the step S12 to determine if the engine speed is higher than that speed required for fuel cutoff. That is, the cutoff of fuel is determined not only by throttle position, but also by engine speed. If the engine speed is relatively high and the throttle valve is in its idle position, it can be assumed that there is an extreme deceleration condition that requires fuel cut.

Thus, at the step S12, if it is determined that the engine speed is not higher than the speed at which fuel cut is required, the program repeats back to the beginning of step S12. If, however, the speed is higher than that speed, then the program moves to the step S13 so as to initiate fuel cut by shutting off the control signal to the fuel injector. This condition is shown in FIG. 20 by the curve c therein, wherein the fuel shutoff is initiated by stopping the pulses to the fuel injector as the associated vehicle speed falls, as shown in the curve a.

Figure 20:
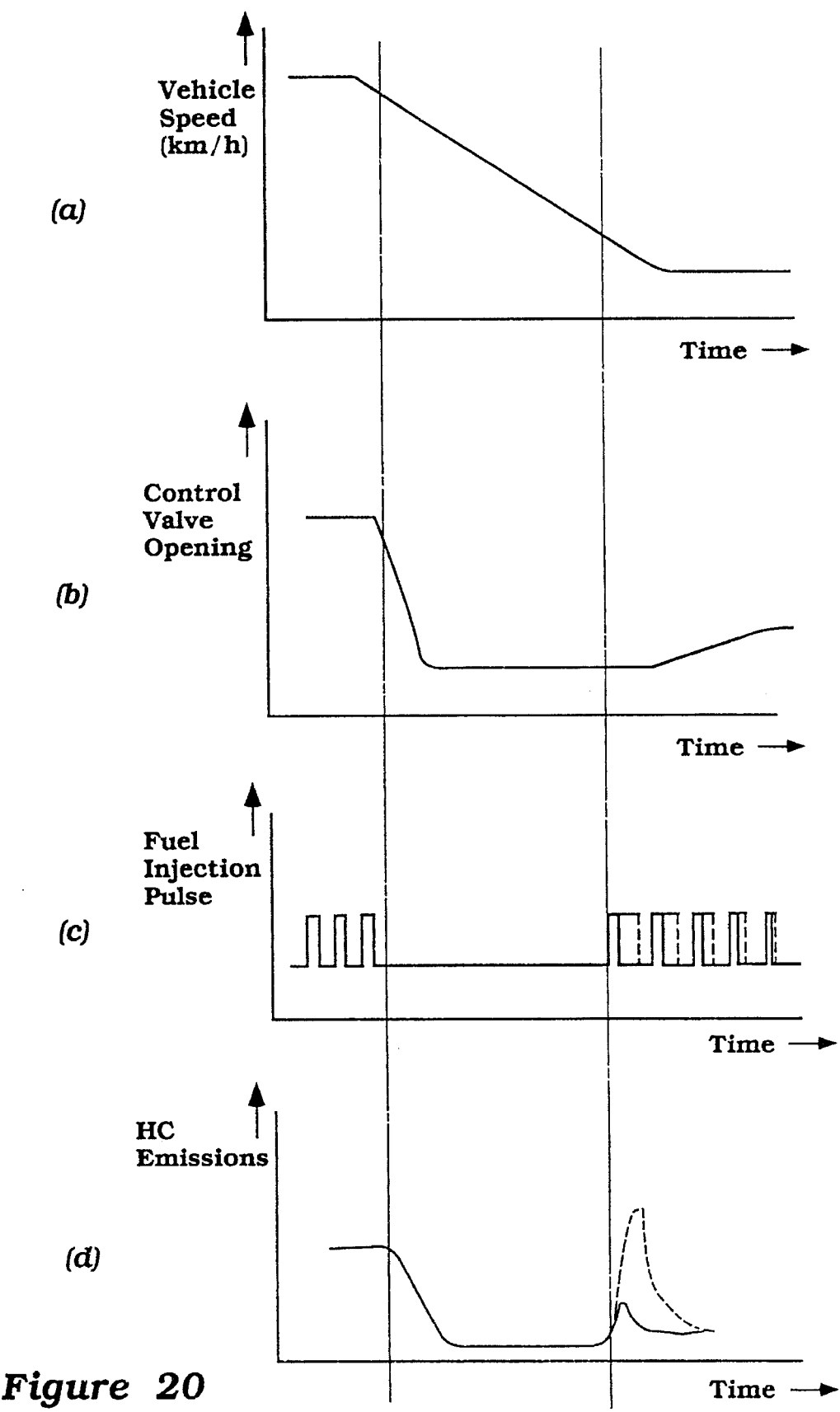
FIG. 20 is a series of curves showing the conditions of vehicle speed, control valve opening, fuel injection pulse duration, and hydrocarbon emission during the condition when there has been a fuel cutoff and the resumption of fuel supply in accordance with the embodiment of FIGS. 18 and 19.

The program then moves to the step S14 so as to close the control valve 61 to its maximum turbulence generating position (fully closed), as shown by curve b of FIG. 20.

The program then moves to the step S15 to determine if the engine condition has changed so that fuel cut is no longer required and the fuel cut is removed. If the fuel cut has not been removed, then the program moves back to the step S15.

If, however, at the step S15 it is determined that the fuel cut has been removed, then the program moves to the step S16 so as to gradually begin to open the control valve 61. The program then moves to the step S17 so as to initiate fuel flow for return to normal by determining the amount of fuel required for a return to normal operation.

The program then moves to the step S18 so as to read the present angle of the control valve 61. This information is then used at the step S19 so as to read the corrective factor for the amount of fuel to be supplied after fuel cut from the curve of FIG. 19. This corrective factor is lower when the control valve 61 is fully closed and turbulence is generated, and increases as the position of the control valve 61 is increased so as to decrease turbulence. Said another way, the amount of fuel correction is lessened when the control valve 61 is closed. This is done in the ECU section 65 (FIG. 2).

The program then moves to the step S20 so as to calculate the fuel injection amount for the return to normal by taking the value determined at the step S17 and multiplying it by the correction factor determined at the step S19. The fuel injection duration control signal B is then sent at the step S21.

FIG. 20 shows the effect of this operation and also, in addition to the operation of the fuel injection pulse, the control valve position under this routine. That is, as shown in the curve B, when the fuel cut is initiated, the control valve 61 is moved toward its closed position, and once fuel cut is stopped, then the control valve 61 is again opened toward its normal position. As seen by the broken line of injection pulses in curve c of FIG. 20, this permits a reduction in the amount of fuel injected, and curve d shows the effect of this on hydrocarbon emissions. Up until the point when fuel cut is stopped, the emission curve is the same as a conventional engine. However, if there is no control valve present, the hydrocarbon emissions will peak when the fuel cut is stopped, whereas with this invention, the hydrocarbon emissions can be substantially reduced by the operation of the control valve so as to increase turbulence at the time when the fuel supply is again initiated.

Another transient condition where the control valve 61 may be employed so as to improve engine performance and exhaust emission control, is during starting. During starting, the engine is turned at a speed slower than its normal running speed, and as a result, the intake charge is delivered to the engine with conventional induction systems at a lower velocity than even idle running. To compensate for this slow air flow and lack of turbulence, it is the normal practice to provide additional enrichment in the fuel during starting. This obviously not only increases fuel consumption, but also can increase hydrocarbon emissions.

By appropriately positioning the control valve 61 during starting, it is possible to induce turbulence, either in the form of tumble, swirl, or both, so as to permit the use of a leaner-than-normal fuel mixture for this condition than with conventional engines.

Figure 21:
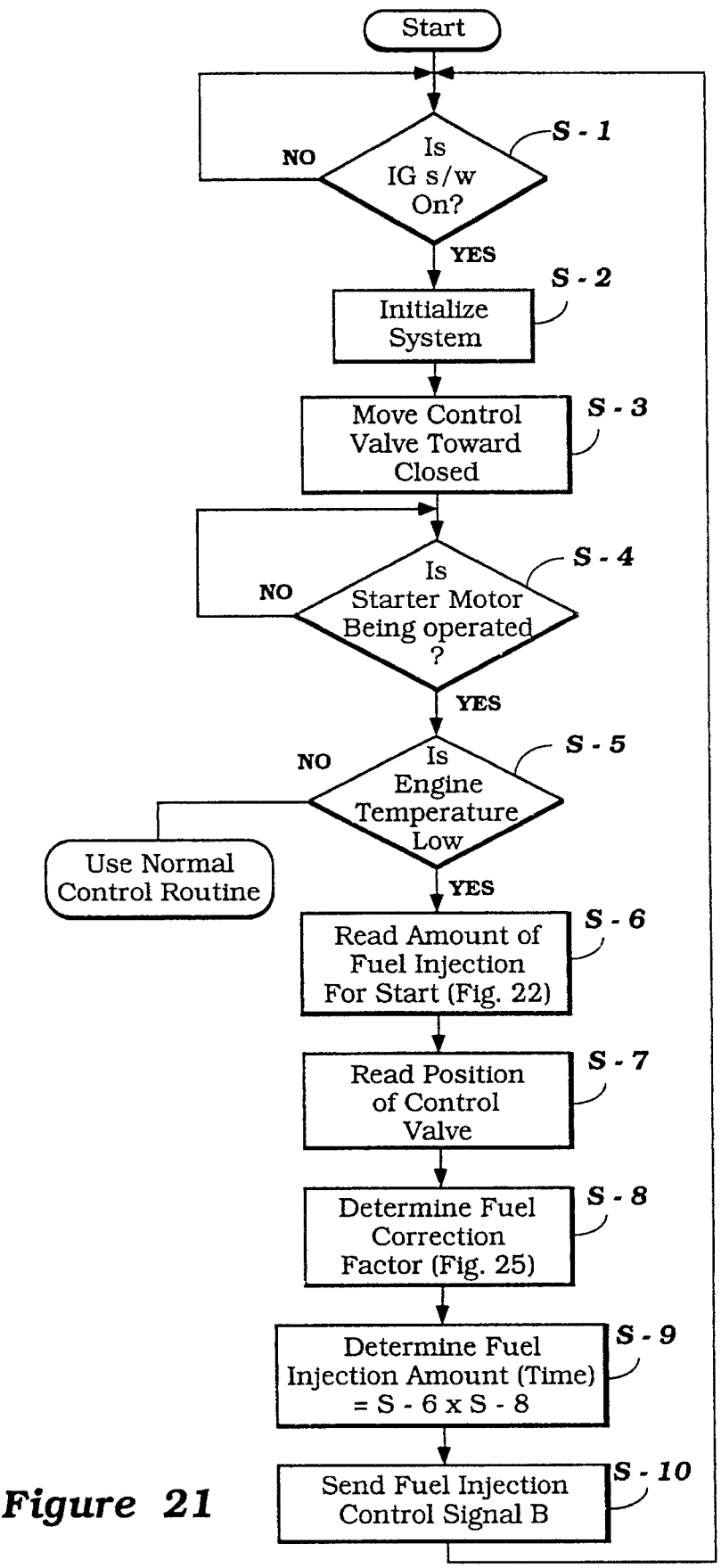
FIG. 21 is a block diagram of a control routine in accordance with another embodiment of the invention for engine starting.

FIG. 21 shows a control routine for starting under these conditions, and FIGS. 22–25 are graphical views that will be employed in conjunction with explaining the starting routine. Referring specifically to FIG. 21, once the program starts, it moves to the step S1 to determine if the ignition switch has been turned on. If it has not, the program repeats.

If, however, it is determined that the ignition switch has been turned on at the step S1, the program moves to the step S2 so as to initialize the system by resetting. The program then moves to the step S3 so as to move the control valve 61 in a closing direction to its fully closed position wherein maximum turbulence is generated.

The program then moves to the step S4 to determine if the starter motor for the engine is being operated. This input is provided to the ECU 58 in an appropriate manner so that the condition of the starter motor can be determined by the ECU. If the starter motor is not being operated, the program repeats.

If, however, at the step S4 it is determined that the starter motor is being operated, then the program moves to the step S5 so as to determine the temperature of the engine by sensing the temperature of the coolant. If the coolant is above a predetermined temperature (warm or hot start), then the program moves to the normal control routine.

Figure 22:
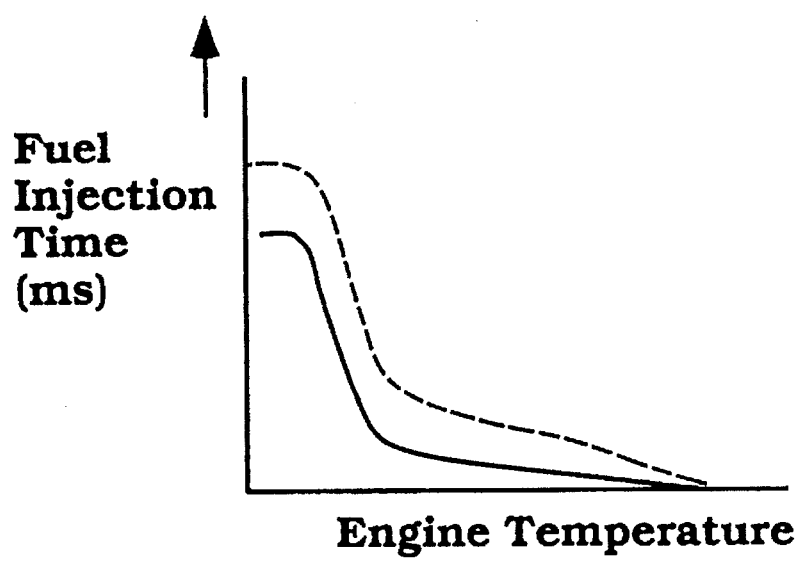
FIG. 22 is a graphical view showing the relationship of fuel injection amount for starting in relation to temperature for systems with the control valve (solid-line curve) and without the control valve (broken-line curve).

If, however, it is determined at the step S5 that the engine temperature is below a predetermined value, then the program moves to the step S6 so as to read the amount of engine fuel required for starting from FIG. 22. In FIG. 22, the solid-line curve shows the amount of fuel required for starting at temperatures below the predetermined temperature, both with the use of the control valve (solid-line curve) and without the use of the control valve (broken-line curve). It should be readily apparent that the amount of fuel required without the control valve is substantially greater at all temperature conditions below the predetermined temperature.

Once the starting amount of fuel has been read from the graph of FIG. 22, the program moves to the step S7 so as to read the actual position of the control valve 61. It should be noted that the control valve 61, although actuated at the step S3 to its fully closed position, may, for a variety of reasons, not be fully closed.

Once the position of the control valve has been read at the step S7, the program moves to the step S8 so as to determine the corrective factor for the amount of starting fuel to be supplied, dependent upon the position of the control valve 61. This is done by a curve like that shown in FIG. 25, which shows the correction factor in relation to the degree of tumble valve opening. It will be seen that when the tumble valve is fully opened, the correction factor is high while it falls as the tumble valve is closed. This reflects the same characteristics as that shown in FIG. 22. This is done in the ECU section 65 (FIG. 2).

Once the correction factor has been read at the step S8, the program moves to the step S9 so as to determine the amount of fuel to be supplied for starting. This is done by multiplying the fuel value determined at the step S6 by the correction factor determined at the step S8. This signal is then outputted as the actuation signal B for the fuel injector to initiate the fuel injection at the step S10.

Figure 23:
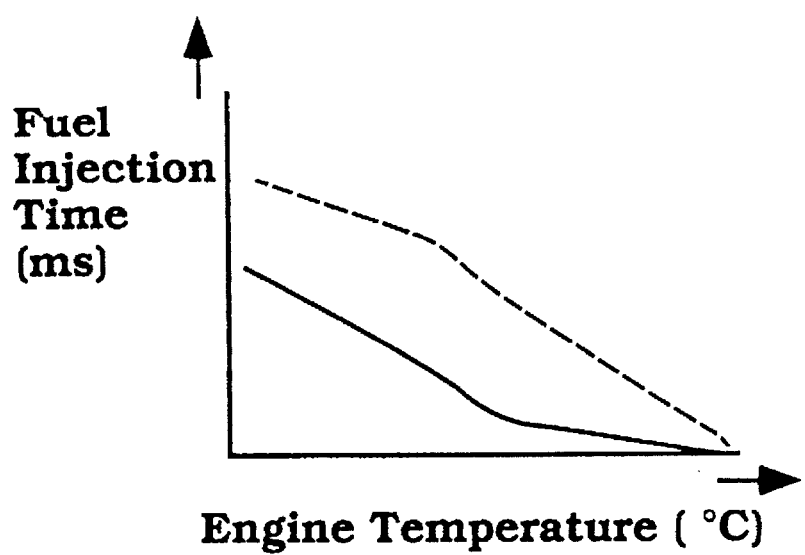
FIG. 23 is a graphical view showing the amount of fuel required in relation to temperature at the time immediately after engine startup with and without a control valve.

Once the engine has actually been started, the program then sets an initial fuel amount for a brief time period just after starting, which is determined from the curve of FIG. 23, this curve being dependent upon the actual temperature of the engine at the time it is started. The solid-line curve shows the amount of fuel required for initial running after starting when the control valve 61 is employed, while the broken-line curve shows the amount if the control valve is not employed. Again, it will be seen that substantially less fuel is required for initial start running when the control valve 61 is employed to generate turbulence.

Figure 24:
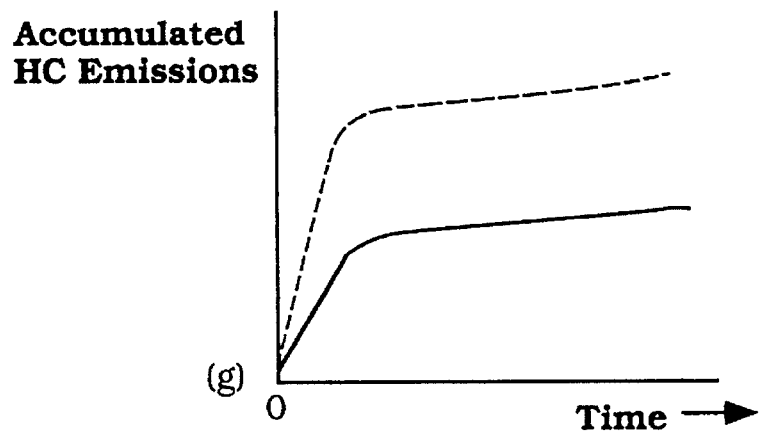
FIG. 24 is a family of curves showing the accumulated hydrocarbon emission relative to time after engine starting in accordance with this start-up control routine and the prior art.
Figure 25:
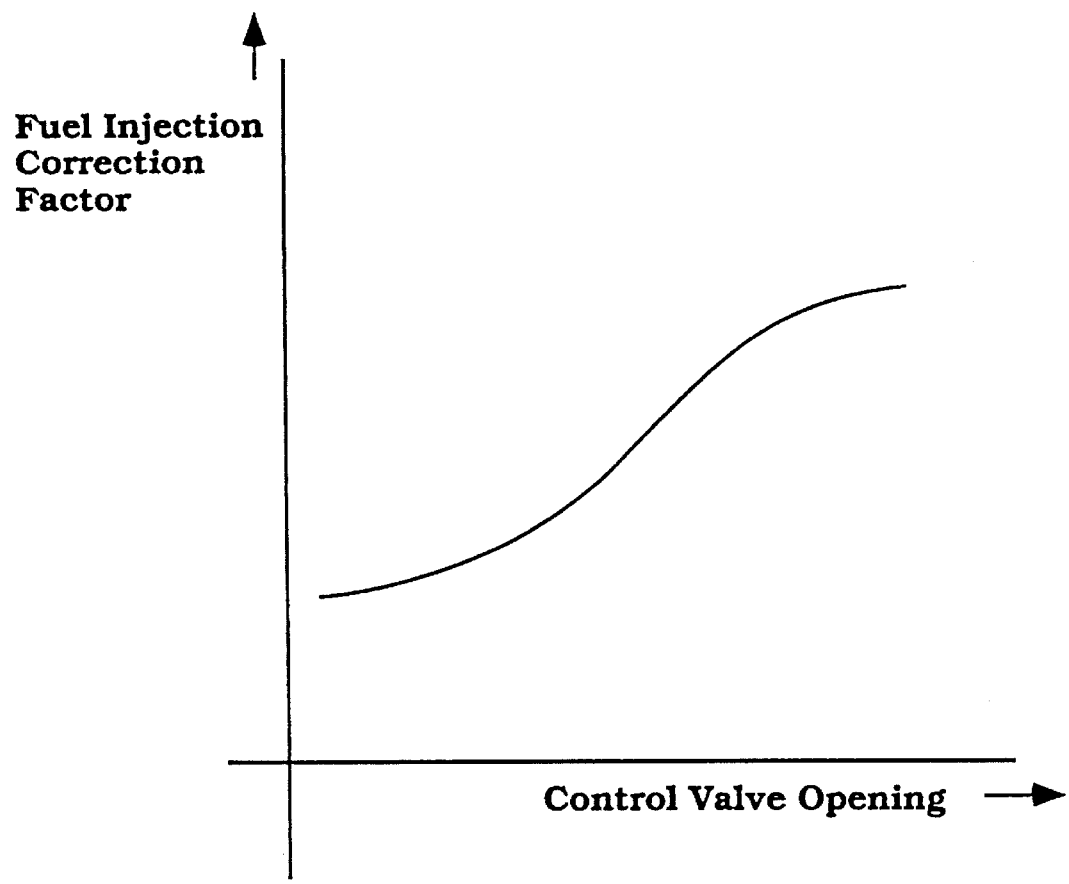
FIG. 25 is a graphical view showing the fuel injection correction amount relative to the degree of control valve opening in accordance with this start-up embodiment.

The net effect of this can be understood by reference to FIG. 24, which shows the accumulated hydrocarbon emissions in the exhaust in relation to time from the initiation of starting. The solid-line curve shows the accumulated hydrocarbon emissions when the control valve is employed, while the broken-line curve shows that when no control valve is employed. It will be seen from this that hydrocarbon emissions are substantially reduced in conjunction with this invention.

A further transient condition wherein the control valve 61 may be advantageously employed in conjunction with the fuel supply circuit to improve engine performance and reduce hydrocarbon emissions is during cold warmup. Again, it is the normal practice with conventional induction systems to provide a relatively rich mixture during this condition to compensate for the slow velocity of the charge through the induction system and its reduced temperature that can cause fuel condensation. Obviously, this deteriorates both fuel economy and exhaust emission control. These conditions can significantly be improved through the use of the control valve 61 and its turbulence increasing function.

Figure 26:
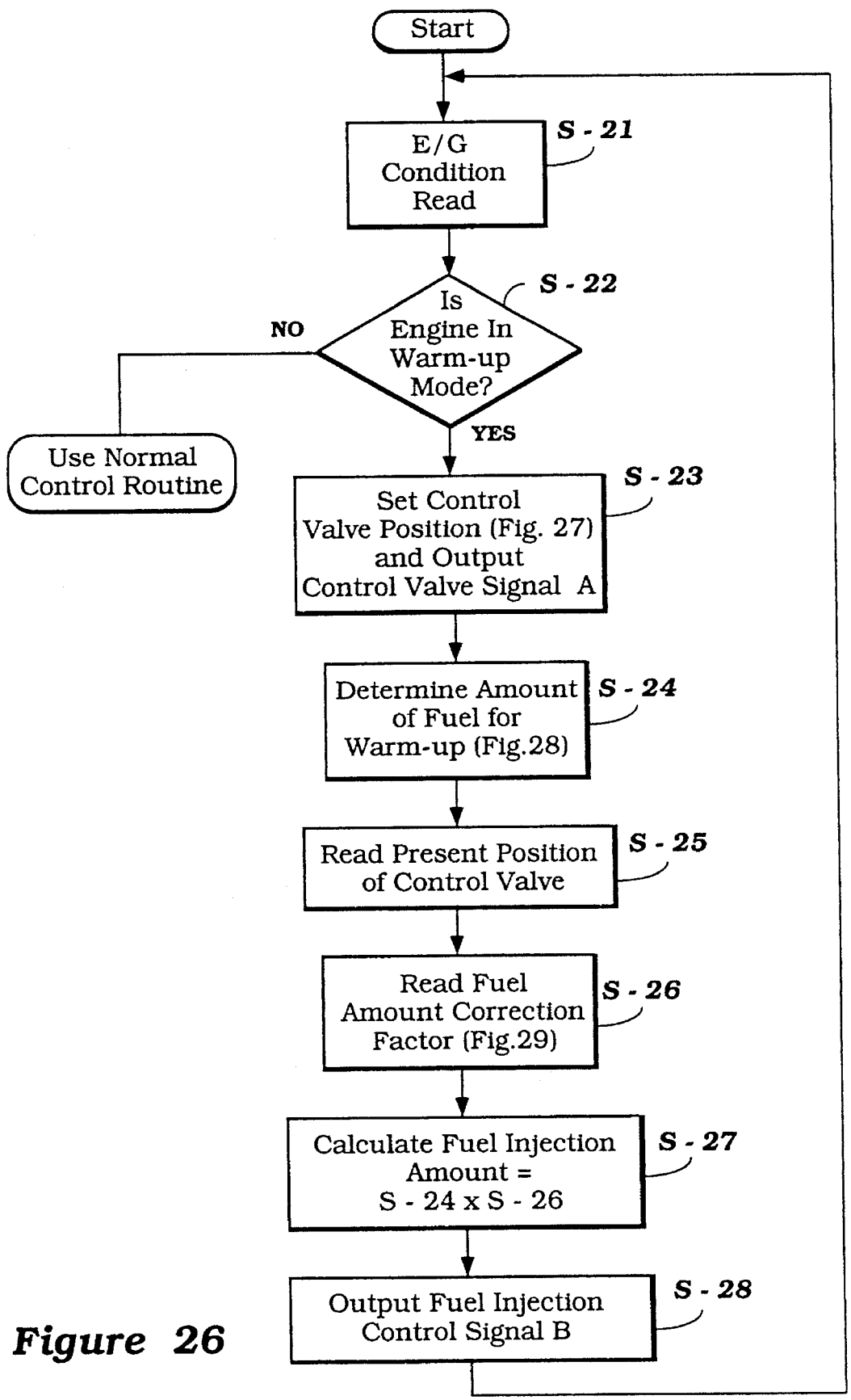
FIG. 26 is a block diagram showing a control routine in accordance with an embodiment for improving the engine performance during warmup.
Figure 27:
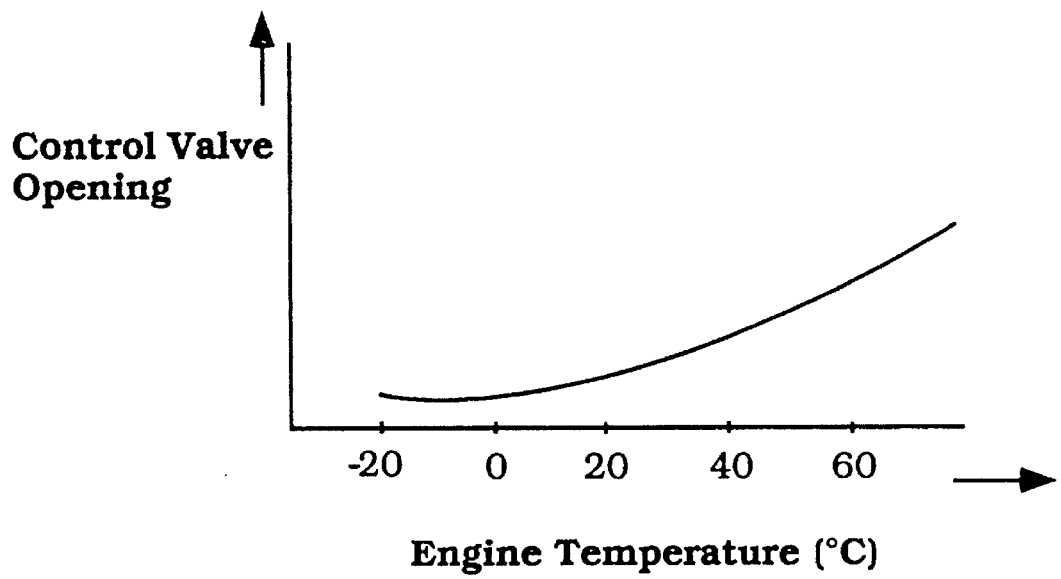
FIG. 27 is a graphical view showing the degree-of control valve opening after starting and during warmup in relation to engine temperature.
Figure 28:
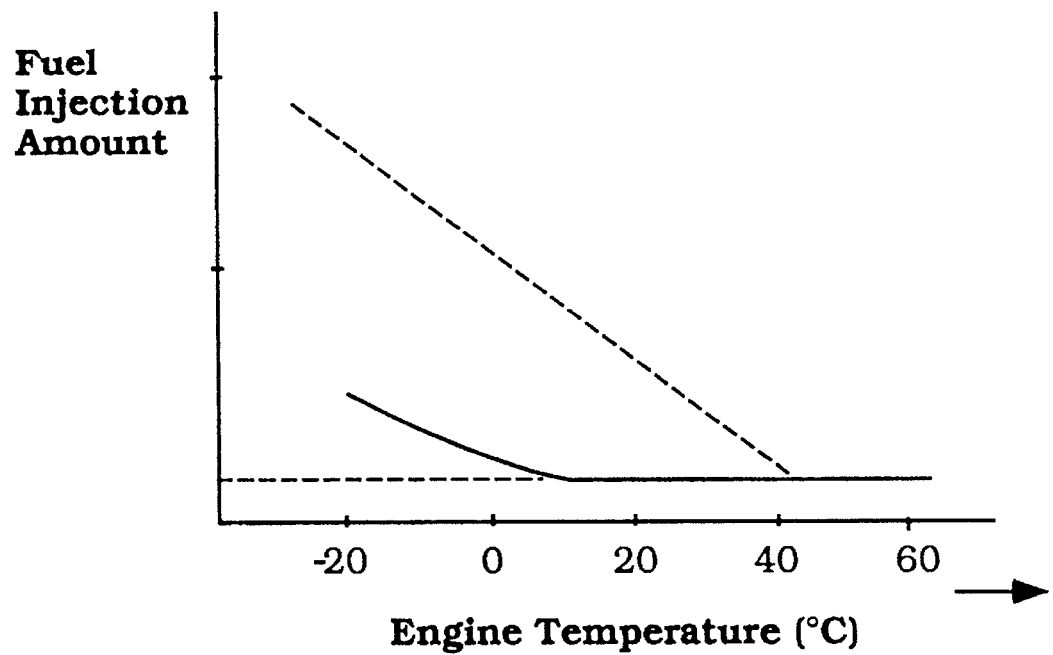
FIG. 28 is a graphical view showing the fuel injection amount required in accordance with this embodiment and the prior art type of construction in relation to temperature during the warm-up mode.
Figure 29:
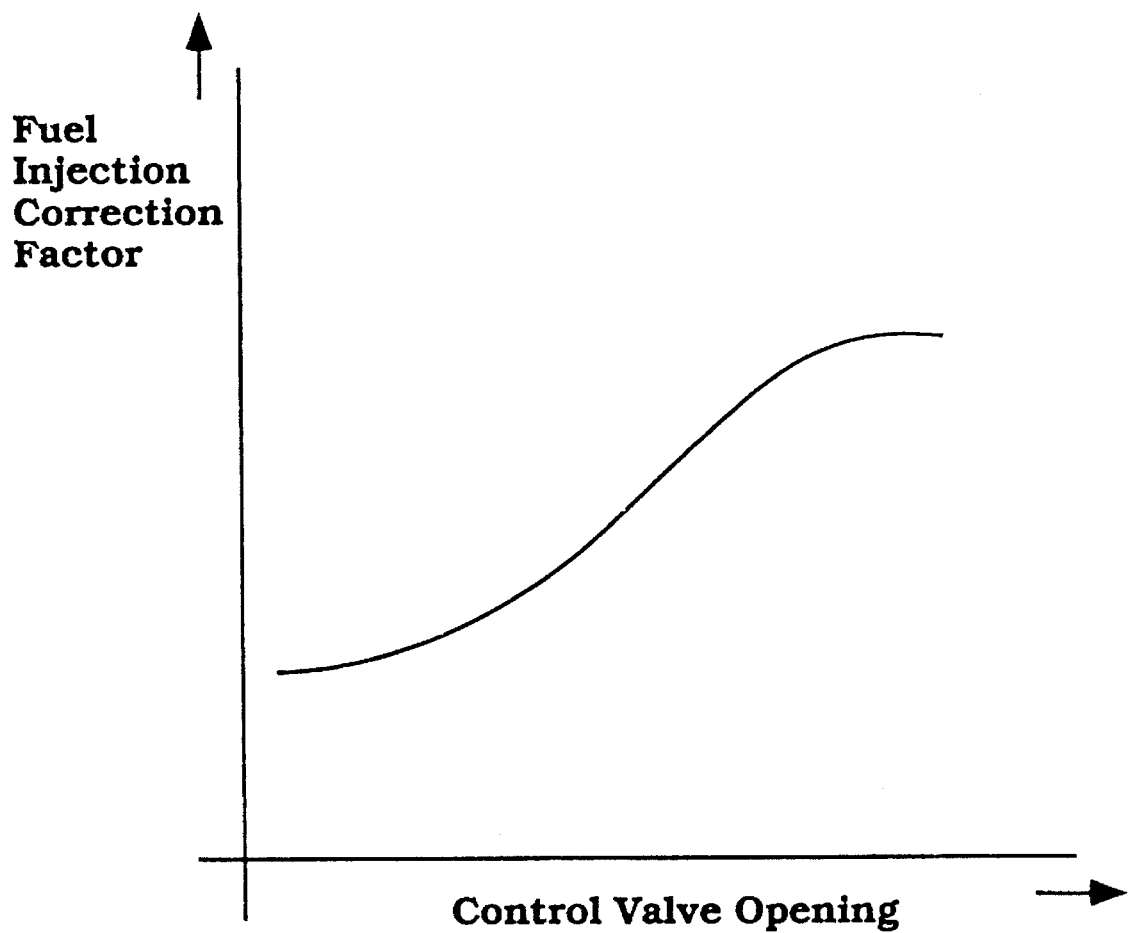
FIG. 29 is a graphical view showing the correction amount of fuel injected in response to control valve opening under the warm-up procedures set forth in this embodiment.

FIG. 26 is a graphical view of a control routine for accommodating this condition which, like the other control routines described, is superimposed on the basic control routine and which may be used with any or all of the other control routines disclosed herein. FIGS. 27–29 are graphical views useful in understanding this embodiment.

In this embodiment and under this control subroutine, which may follow the starting routine described in conjunction with FIGS. 21–25, the program starts and moves to the step S21 to read the engine conditions. The program then moves to the step S22 to determine if the engine is in a warming-up condition, which can be determined by reference to FIG. 28.

FIG. 28 shows the fuel injection amount required for warming-up and normal operation in response to engine temperature (coolant temperature). It will be seen that if the engine is operating at normal temperature, the dotted line curve will be the amount of fuel supplied. However, in conjunction with the invention utilizing the control valve 61, if the temperature is below approximately 10° C., then enrichment of the fuel is required. This amount of enrichment is, however, substantially less than that provided for a conventional engine not employing the control valve which follows the broken-line curve and at a lower temperature than the warmup of a conventional engine. It will be seen that when the control valve 61 is not employed, then enrichment must occur at temperatures below about 45° C. and the amount of enrichment is substantially increased from that in conjunction with this invention.

If at the step S22 it has been determined that the engine is not in a warming-up condition (engine temperature above 10° C.), the program moves to the normal control routine.

If at the step S22 it has been determined that the engine is operating in a warm-up period when the coolant temperature is below the predetermined value (10° C. in the illustrated embodiment), then the program moves to the step S23 to set the control valve position 61 in its desired position in accordance with a map of the type shown in FIG. 27. This control valve position is determined by the actual engine temperature as measured and determined at the step S21 and the control valve is maintained in its closed position until the engine temperature reaches something slightly above 0° C. and then is gradually opened during the warm-up period.

Once the desired control valve position is determined, the ECU 58 outputs a signal A to the stepper motor for the control valve 61 so as to position it as determined (step S23).

The program then moves to the step S24 so as to determine the amount of fuel required for the engine temperature. This is determined by a map or graph, as shown in FIG. 28, wherein the normal fuel level at normal operating condition is shown in the broken-line curve that runs horizontally, and which provides increased amounts of fuel until the temperature reaches approximately 10° C., at which time additional fuel is not necessary.

The program then moves to the step S25 to read the present position of the control valve 61. Once this reading is taken, the program then moves to the step S26 to determine a correction factor for the amount of fuel required in response to the control valve position from a map as shown in FIG. 29. When the control valve is fully closed, the correction factor is relatively small, but as the control valve opens, the correction factor becomes greater, again showing the effectiveness of the control. This correction is done in the ECU section 69 (FIG. 2).

The program then moves to the step S27 so as to calculate the actual amount of fuel required by multiplying the amount determined at the step S24 by the correction factor determined at the step S26. The program then moves to the step S28, wherein the ECU 58 outputs the appropriate signal B to the fuel injector 57 to provide the desired fuel injection duration.

It should be readily apparent from the foregoing description that the described embodiments of the invention are extremely effective in providing good running conditions for an engine by controlling the degree of turbulence through the positioning of the control valve under all running conditions. In addition to meeting the requirements under steady state conditions, optimum performance can be achieved under transient conditions, and this is possible without having the need to supply excess fuel and resulting in poor fuel economy and poor emission control. As has been noted, the various control subroutines can be utilized, either alone or in combination with each other. Various other changes and modifications may be made without department from the spirit and scope of the invention, as defined by the appended claims.

I claim:

1. An induction system for an internal combustion engine having a pair of relatively movable components defining a combustion chamber which varies cyclicly in volume upon the relative movement between said components, an induction system for delivering an intake charge to said combustion chamber, control valve means in said induction system and movable between a first opened position wherein the flow of charge from said induction system to said combustion chamber enters said combustion chamber without generating significant turbulence and at a relatively low velocity and a second position wherein the charge entering the combustion chamber is turbulent and at a high velocity, engine sensing means for sensing at least one running condition of said engine, transient condition sensing means for sensing a transient condition, and control means for setting the position of said control valve in response to the output signals of said sensing means of the sensed engine condition and the sensed transient condition for providing the desired degree of turbulence for both types of conditions.

2. The induction system of claim 1, wherein the transient running condition is a deviation from the target idle speed.

3. The induction system of claim 2, wherein the control valve is moved to a position to generate more turbulence when the idle speed is lower than the target idle speed.

4. The induction system of claim 3, wherein the control valve is moved to a position to create less turbulence when the idle speed is higher than the target idle speed.

5. The induction system of claim 4, wherein the control valve is also moved to a position to generate more turbulence when the idle speed is less than the target idle speed.

6. The induction system of claim 5, further including controlling the target idle speed in response to the sensed temperature of the engine.

7. The induction system of claim 2, further including controlling the target idle speed in response to the sensed temperature of the engine.

8. The induction system of claim 1, wherein the transient condition is the supply of exhaust gases to the combustion chamber.

9. The induction system of claim 8, wherein the amount of exhaust gases supplied to the combustion chamber is increased in response to an increase in the amount of turbulence generated by the control valve.

10. The induction system of claim 8, wherein the amount of turbulence is increased when the amount of exhaust gases delivered to the combustion chamber is increased.

11. The induction system of claim 8, wherein the exhaust gases are delivered to the combustion chamber through the induction system at a point upstream of the control valve.

12. The induction system of claim 11, further including delaying the change in the position of the control valve until a change in the amount of exhaust gas flow will have reached said control valve.

13. The induction system of claim 12, wherein the delay in the change of the position of the control valve is done only when the amount of exhaust gases delivered to the combustion chamber is reduced.

14. The induction system of claim 1, wherein the transient condition is a change of engine speed.

15. The induction system of claim 14, further including charge forming means for supplying fuel to the engine and means for varying the amount of fuel delivered by the charge forming means in response to the position of the control valve.

16. The induction system of claim 15, wherein the amount of fuel supplied is less when the control valve is in a position to generate more turbulence in the combustion chamber.

17. The induction system of claim 14, wherein the change of speed comprises an acceleration.

18. The induction system of claim 17, further including charge forming means for supplying fuel to the combustion chamber and means for providing additional fuel to the engine from the charge forming means in response to the acceleration condition.

19. The induction system of claim 18, wherein the amount of additional fuel supplied to the engine upon acceleration is decreased as the control valve is positioned in a condition to increase the turbulence in the combustion chamber.

20. The induction system of claim 14, wherein the change of speed condition comprises a deceleration.

21. The induction system of claim 20, wherein the control valve is positioned in response to deceleration only when the deceleration is more than a predetermined amount.

22. The induction system of claim 21, further including charge forming means for supplying fuel to the combustion chamber and means for discontinuing the supply of fuel to the combustion chamber by said charge forming means when the deceleration is more than a predetermined amount.

23. The induction system of claim 22, wherein the control valve is moved to its turbulence generating position when the supply of fuel is discontinued.

24. The induction system of claim 23, wherein the charge forming means is controlled to resume the supply of fuel when the deceleration condition has fallen below a predetermined amount.

25. The induction system of claim 24, further including means for opening the control valve means to provide less turbulence when the fuel is again supplied.

26. The induction system of claim 25, further including providing additional fuel to the engine when the control valve is moved to its position for decreasing the amount of turbulence.

27. The induction system of claim 1, wherein the transient condition is starting of the engine.

28. The induction system of claim 27, wherein the control means moves the control valve to a turbulence generating position upon the initiation of starting.

29. The induction system of claim 28, further including charge forming means for supplying fuel to the engine and means for supplying additional fuel to the engine from the charge forming means upon starting.

30. The induction system of claim 29, wherein the amount of additional fuel supplied is reduced when the control valve means is moved to a position for generating more turbulence in the combustion chamber.

31. The induction system of claim 30, further including means for measuring the temperature of the engine and controlling the position of the control valve in response to the measured temperature.

32. The induction system of claim 30, further including means for measuring the temperature of the engine and means for controlling the amount of additional fuel supplied in response to the measured temperature.

33. The induction system of claim 1, wherein the transient condition comprises engine warmup.

34. The induction system of claim 33, wherein engine warmup is determined if engine temperature is below a predetermined temperature.

35. The induction system of claim 34, wherein the predetermined temperature is a temperature substantially lower than normal running temperature.

36. The induction system of claim 35, further including charge forming means for supplying fuel to the engine and means for causing the charge forming means to supply additional fuel to the engine in response to warm-up conditions.

37. The induction system of claim 36, wherein the amount of additional fuel supplied to the engine by the charge forming means is decreased when the control valve is in a position for generating increased turbulence.

38. The induction system of claim 1, further including charge forming means for supplying fuel to the engine and means for controlling the amount of fuel supplied by the charge forming means in response to the sensed engine conditions.

39. The induction system of claim 38, wherein the amount of fuel supplied to the engine by the charge forming means is decreased when the control valve is in a position for generating turbulence in the combustion chamber.

40. The induction system of claim 1, wherein the engine comprises a reciprocating engine and one of the relatively movable components comprises a cylinder block cylinder head assembly and the other of the relatively movable components comprises a piston slidably supported within a cylinder bore in the cylinder block.

41. The induction system of claim 40, wherein the induction system comprises an intake passage formed at least in part in the cylinder head and terminating at the combustion chamber.

42. The induction system of claim 41, wherein the control valve extends across the intake passage and is movable between the first position wherein the intake passage configuration is not interrupted and the second position wherein the control valve extends into the intake passage for redirecting the flow of charge into the combustion chamber from the intake passage to generate the turbulence.

43. The induction system of claim 42, wherein the turbulence comprises at least one of tumble or swirl.

44. The induction system of claim 43, wherein both tumble and swirl are generated in at least one position of the control valve.

45. The induction system of claim 43, further including a charge forming device for supplying fuel to the engine.

46. The induction system of claim 38, wherein the amount of fuel supplied to the engine by the charge forming means is decreased when the control valve is in a position for generating turbulence in the combustion chamber.

47. An internal combustion engine comprised of a pair of relatively movable components defining a combustion chamber of a volume which varies cyclicly upon the relative movement of the components, an induction system for delivering an intake charge to the combustion chamber, control valve means in said induction system and movable between a first position wherein the charge which enters the combustion chamber from the induction system is at a relatively low velocity and generates substantially no turbulence in the combustion chamber, and a second position wherein the charge entering the chamber flows at a higher velocity due to a restriction in the area of the intake passage and in a direction for creating turbulence in the combustion chamber, means for setting a target idle speed, and means for operating the control valve means to maintain the target idle speed.

48. The internal combustion engine of claim 47, wherein the control valve is moved to a position to generate more turbulence when the idle speed is lower than the target idle speed.

49. The internal combustion engine of claim 47, wherein the control valve is moved to a position to create less turbulence when the idle speed is higher than the target idle speed.

50. The internal combustion engine of claim 49, wherein the control valve is also moved to a position to generate more turbulence when the idle speed is less than the target idle speed.

51. The internal combustion engine of claim 50, further including controlling the target idle speed in response to the sensed temperature of the engine.

52. The internal combustion engine of claim 47, further including controlling the target idle speed in response to the sensed temperature of the engine.

53. The internal combustion engine of claim 47, wherein the engine comprises a reciprocating engine and one of the relatively movable components comprises a cylinder block, cylinder head assembly and the other of the relatively movable components comprises a piston slidably supported within a cylinder bore in the cylinder block.

54. The induction system of claim 40, wherein the induction system comprises an intake passage formed at least in part in the cylinder head and terminating at the combustion chamber.

55. The internal combustion engine of claim 54, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

56. The internal combustion engine of claim 55, wherein the turbulence comprises at least one of tumble or swirl.

57. The internal combustion engine of claim 56, wherein the control valve is moved to a position to generate more turbulence when the idle speed is lower than the target idle speed.

58. The internal combustion engine of claim 56, wherein the control valve is moved to a position to create less turbulence when the idle speed is higher than the target idle speed.

59. The internal combustion engine of claim 57, wherein the control valve is also moved to a position to generate more turbulence when the idle speed is less than the target idle speed.

60. An internal combustion engine comprising a pair of relatively movable components defining a combustion chamber the volume of which varies cyclicly during the relative movement of the components, an induction system for delivering an intake charge to said combustion chamber, control valve means in said induction system movable between a first position wherein the charge which enters the combustion chamber from the induction system is at a relatively low velocity and wherein the charge generates substantially no turbulence in the combustion chamber, and a second position wherein the charge enters the chamber at a relatively higher velocity due to a restriction in the effective cross-sectional area of the induction system, and wherein turbulence is generated in the combustion chamber, an exhaust system for discharging exhaust gases from the combustion chamber, an exhaust gas recirculation system for circulating exhaust gases back from the exhaust system to the combustion chamber through said induction system, exhaust control valve means for controlling the amount of exhaust gases recirculated by said exhaust gas recirculation system, and means for controlling the position of said control valve means and said exhaust gas control valve means in response to the condition of each other.

61. The internal combustion engine of claim 60, wherein the amount of exhaust gases supplied to the combustion chamber is increased in response to an increase in the amount of turbulence generated by the control valve.

62. The internal combustion engine of claim 60, wherein the amount of turbulence is increased when the amount of exhaust gases delivered to the combustion chamber is increased.

63. The internal combustion engine of claim 60, wherein the exhaust gases are delivered to the combustion chamber through the induction system at a point upstream of the control valve.

64. The internal combustion engine of claim 63, further including the delay of the change in the position of the control valve until a change in the amount of exhaust gas flow will have reached the control valve.

65. The internal combustion engine of claim 64, wherein the delay in the change of the position of the control valve is done only when the amount of exhaust gases delivered to the combustion chamber is reduced.

66. The internal combustion engine of claim 60, wherein the engine comprises a reciprocating engine and one of the relatively movable components comprises a cylinder block cylinder head assembly and the other of the relatively movable components comprises a piston slidably supported within a cylinder bore in the cylinder block.

67. The internal combustion engine of claim 66, wherein the induction system comprises an intake passage formed at least in part in the cylinder head and terminating at the combustion chamber.

68. The internal combustion engine of claim 67, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

69. The internal combustion engine of claim 68, wherein the turbulence comprises at least one of tumble or swirl.

70. The internal combustion engine of claim 69, wherein the amount of exhaust gases supplied to the combustion chamber is increased in response to an increase in the amount of turbulence generated by the control valve.

71. The internal combustion engine of claim 69, wherein the amount of turbulence is increased when the amount of exhaust gases delivered to the combustion chamber is increased.

72. The internal combustion engine of claim 69, wherein the exhaust gases are delivered to the combustion chamber through the induction system at a point upstream of the control valve.

73. The internal combustion engine of claim 72, further including delaying the change in the position of the control valve until a change in the amount of exhaust gas flow will have reached the control valve.

74. The internal combustion engine of claim 73, wherein the delay in the change of the position of the control valve is done only when the amount of exhaust gases delivered to the combustion chamber is reduced.

75. An internal combustion engine comprised of a pair of relatively movable components defining a combustion chamber the volume of which varies cyclicly upon relative movement of said components, an induction system for supplying an intake charge to said combustion chamber, control valve means in said induction system and movable between a first position wherein a charge from said induction system enters said combustion chamber without substantial restriction and without substantial turbulence, and a second position wherein the charge entering said combustion chamber from said induction system is restricted and flows at a higher velocity and generates turbulence in said combustion chamber, operator controlled means for controlling the speed of said engine, and means for moving said control valve between its positions in response to actuation of said operator controlled means for varying the amount of turbulence generated in said combustion chamber when said operator control means is in a transient condition.

76. The internal combustion engine of claim 75, further including charge forming means for supplying fuel to the engine and means for varying the amount of fuel delivered by the charge forming means in response to the condition of the control valve.

77. The internal combustion engine of claim 76, wherein the amount of fuel supplied is less when the control valve is in a position to generate more turbulence in the combustion chamber.

78. The internal combustion engine of claim 75, wherein the change of speed comprises an acceleration.

79. The internal combustion engine of claim 78, further including charge forming means for supplying fuel to the combustion chamber and means for providing additional fuel to the engine from the charge forming means in response to the acceleration condition.

80. The internal combustion engine of claim 79, wherein the amount of additional fuel supplied to the engine upon acceleration is decreased as the control valve is positioned in a condition to increase the turbulence in the combustion chamber.

81. The internal combustion engine of claim 75, wherein the change of speed condition comprises a deceleration.

82. The internal combustion engine of claim 81, wherein the control valve is positioned in response to deceleration only when the deceleration is more than a predetermined amount.

83. The internal combustion engine of claim 82, further including charge forming means for supplying fuel to the combustion chamber and means for discontinuing the supply of fuel to the combustion chamber by the charge forming means when the deceleration is more than a predetermined amount.

84. The internal combustion engine of claim 83, wherein the control valve is moved to its turbulence generating position when the supply of fuel is discontinued.

85. The internal combustion engine of claim 84, wherein the charge forming means is controlled to resume the supply of fuel when the deceleration condition has fallen below a predetermined amount.

86. The internal combustion engine of claim 85, further including means for opening the control valve means to provide less turbulence when the fuel supply is resumed.

87. The internal combustion engine of claim 86, further including providing additional fuel to the engine when the control valve is moved to its position for decreasing the amount of turbulence.

88. The internal combustion engine of claim 75, wherein the engine comprises a reciprocating engine and one of the relatively movable components comprises a cylinder block cylinder head assembly and the other of the relatively movable components comprises a piston slidably supported within a cylinder bore in the cylinder block.

89. The internal combustion engine of claim 88, wherein the induction system comprises an intake passage formed at least in part in the cylinder head and terminating at the combustion chamber.

90. The internal combustion engine of claim 89, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

91. The internal combustion engine of claim 90, wherein the turbulence comprises at least one of tumble or swirl.

92. The internal combustion engine of claim 91, further including charge forming means for supplying fuel to the engine and means for varying the amount of fuel delivered by the charge forming means in response to the position of the control valve.

93. The internal combustion engine of claim 92, wherein the amount of fuel supplied is less when the control valve is in a position to generate more turbulence in the combustion chamber.

94. The internal combustion engine of claim 91, wherein the change of speed comprises an acceleration.

95. The internal combustion engine of claim 94, further including charge forming means for supplying fuel to the combustion chamber and means for providing additional fuel to the engine from the charge forming means in response to the acceleration condition.

96. The internal combustion engine of claim 95, wherein the amount of additional fuel supplied to the engine upon acceleration is decreased as the control valve is positioned in a condition to increase the turbulence in the combustion chamber.

97. The internal combustion engine of claim 91, wherein the change of speed condition comprises a deceleration.

98. The internal combustion engine of claim 97, wherein the control valve is positioned in response to deceleration only when the deceleration is more than a predetermined amount.

99. The internal combustion engine of claim 98, further including charge forming means for supplying fuel to the combustion chamber and means for discontinuing the supply of fuel to the combustion chamber by the charge forming means when the deceleration is more than a predetermined amount.

100. The internal combustion engine of claim 99, wherein the control valve is moved to its turbulence generating position when the supply of fuel is discontinued.

101. The internal combustion engine of claim 100, wherein the charge forming means is controlled to resume the supply of fuel when the deceleration condition has fallen below a predetermined amount.

102. The internal combustion engine of claim 101, further including means for opening the control valve means to provide less turbulence when the fuel cutoff is discontinued.

103. The internal combustion engine of claim 102, further including providing additional fuel to the engine when the control valve is moved to its position for decreasing the amount of turbulence.

104. An internal combustion engine comprising a pair of relatively movable components defining a combustion chamber the volume of which varies cyclicly upon the relative movement of said components, an induction system for supplying an intake charge to said combustion chamber, control valve means in said induction system and movable between a first position wherein the charge entering said combustion chamber is substantially unrestricted and generates substantially no turbulence in the combustion chamber, and a second position wherein the charge entering the combustion chamber is restricted for increasing its velocity and for generating turbulence within said combustion chamber, means for starting said engine, and means responsive to the operation of said means for starting said engine for operating said control valve between its positions.

105. The internal combustion engine of claim 104, wherein the control means moves the control valve to its turbulence generating position upon the initiation of starting.

106. The internal combustion engine of claim 105, further including charge forming means for supplying fuel to the engine and means for supplying additional fuel to the engine from the charge forming means upon starting.

107. The internal combustion engine of claim 106, wherein the amount of additional fuel supplied is reduced when the control valve means is moved to a position for generating more turbulence in the combustion chamber.

108. The internal combustion engine of claim 107, further including means for measuring the temperature of the engine and controlling the position of the control valve in response to the measured temperature.

109. The internal combustion engine of claim 107, further including means for measuring the temperature of the engine and means for controlling the amount of additional fuel supplied in response to the measured temperature.

110. The internal combustion engine of claim 104, wherein the engine comprises a reciprocating engine and one of the relatively movable components comprises a cylinder block, cylinder head assembly and the other of the relatively movable components comprises a piston slidably supported within a cylinder bore in the cylinder block.

111. The internal combustion engine of claim 105, wherein the induction system comprises an intake passage formed at least in part in the cylinder head and terminating at the combustion chamber.

112. The internal combustion engine of claim 106, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

113. The internal combustion engine of claim 107, wherein the turbulence comprises at least one of tumble or swirl.

114. The internal combustion engine of claim 113, wherein the control means moves the control valve to its turbulence generating position upon the initiation of starting.

115. The internal combustion engine of claim 114, further including charge forming means for supplying fuel to the engine and means for supplying additional fuel to the engine from the charge forming means upon starting.

116. The internal combustion engine of claim 115, wherein the amount of additional fuel supplied is reduced when the control valve means is moved to a position for generating more turbulence in the combustion chamber.

117. The internal combustion engine of claim 116, further including means for measuring the temperature of the engine and controlling the position of the control valve in response to the measured temperature.

118. The internal combustion engine of claim 116, further including means for measuring the temperature of the engine and means for controlling the amount of additional fuel supplied in response to the measured temperature.

119. An internal combustion engine comprised of a pair of relatively movable components defining a combustion chamber that varies cyclicly in volume upon relative movement of said components, an induction system for supplying an intake charge to said combustion chamber, control valve means in said induction system and movable between a first position wherein the charge entering said combustion chamber is substantially unrestricted and generates substantially no turbulence in said combustion chamber, and a second position wherein the charge flowing through said induction system is restricted for increasing its velocity and for generating turbulence in said combustion chamber, means for sensing the temperature of said engine, and means for operating said control valve means between said positions in response to changes in the temperature of said engine.

120. The internal combustion engine of claim 119, wherein the temperature comprises an engine warm-up temperature.

121. The internal combustion engine of claim 120, wherein engine warmup is determined if the temperature is below a predetermined temperature.

122. The internal combustion engine of claim 121, wherein the predetermined temperature is a temperature substantially lower than normal running temperature.

123. The internal combustion engine of claim 122, further including charge forming means for supplying fuel to the engine and means for causing the charge forming means to supply additional fuel to the engine in response to warm-up conditions.

124. The internal combustion engine of claim 119, wherein the engine comprises a reciprocating engine and one of the relatively movable components comprises a cylinder block cylinder head assembly and the other of the relatively movable components comprises a piston slidably supported within a cylinder bore in the cylinder block.

125. The internal combustion engine of claim 124, wherein the induction system comprises an intake passage formed at least in part in the cylinder head and terminating at the combustion chamber.

126. The internal combustion engine of claim 125, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

127. The internal combustion engine of claim 126, wherein the turbulence comprises at least one of tumble or swirl.

128. The internal combustion engine of claim 127, wherein the temperature comprises an engine warm-up temperature.

129. The internal combustion engine of claim 128, wherein engine warm-up temperature is determined if the temperature is below a predetermined temperature.

130. The internal combustion engine of claim 129, wherein the predetermined temperature is a temperature substantially lower than normal running temperature.

131. The internal combustion engine of claim 130, further including charge forming means for supplying fuel to the engine and means for causing the charge forming means to supply additional fuel to the engine in response to warm-up conditions.

132. The internal combustion engine of claim 131, wherein the amount of additional fuel supplied to the engine by the charge forming means is decreased when the control valve is in a position for generating increased turbulence.

133. An operating method for an internal combustion engine having a pair of relatively movable components defining a combustion chamber which varies cyclicly in volume upon the relative movement between said components, an induction system for delivering an intake charge to said combustion chamber, control valve means in said induction system and movable between a first opened position wherein the flow of charge from said induction system to said combustion chamber enters said combustion chamber without generating significant turbulence and at a relatively low velocity and a second position wherein the charge entering the combustion chamber is turbulent and at a high velocity, said method comprising the steps of sensing at least one running condition of said engine, sensing a transient condition, and setting the position of said control valve in response to the sensed engine condition and the sensed transient condition.

134. The operating method of claim 133, wherein the transient running condition is a deviation from the target idle speed.

135. The operating method of claim 134, wherein the control valve is moved to a position to generate more turbulence when the idle speed is lower than the target idle speed.

136. The operating method of claim 135, wherein the control valve is moved to a position to create less turbulence when the idle speed is higher than the target idle speed.

137. The operating method of claim 136, wherein the control valve is also moved to a position to generate more turbulence when the idle speed is less than the target idle speed.

138. The operating method of claim 137, further including controlling the target idle speed in response to the sensed temperature of the engine.

139. The operating method of claim 134, further including controlling the target idle speed in response to the sensed temperature of the engine.

140. The operating method of claim 133, wherein the transient condition is the supply of exhaust gases to the combustion chamber.

141. The operating method of claim 140, wherein the amount of exhaust gases supplied to the combustion chamber is increased in response to an increase in the amount of turbulence generated by the control valve.

142. The operating method of claim 140, wherein the amount of turbulence is increased when the amount of exhaust gases delivered to the combustion chamber is increased.

143. The operating method of claim 140, wherein the exhaust gases are delivered to the combustion chamber through the induction system at a point upstream of the control valve.

144. The operating method of claim 143, further including delaying the change in the position of the control valve until a change in the amount of exhaust gas flow will have reached the control valve.

145. The operating method of claim 144, wherein the delay in the change of the position of the control valve is done only when the amount of exhaust gases delivered to the combustion chamber is reduced.

146. The operating method of claim 133, wherein the transient condition is a change of engine speed.

147. The operating method of claim 146, further including charge forming means for supplying fuel to the engine and varying the amount of fuel delivered by the charge forming means in response to the condition of the control valve.

148. The operating method of claim 147, wherein the amount of fuel supplied is less when the control valve is in a position to generate more turbulence in the combustion chamber.

149. The operating method of claim 146, wherein the change of speed comprises an acceleration.

150. The operating method of claim 149, further including charge forming means for supplying fuel to the combustion chamber and providing additional fuel to the engine from the charge forming means in response to the acceleration condition.

151. The operating method of claim 150, wherein the amount of additional fuel supplied to the engine upon acceleration is decreased as the control valve is positioned in a condition to increase the turbulence in the combustion chamber.

152. The operating method of claim 146, wherein the change of speed condition comprises a deceleration.

153. The operating method of claim 152, wherein the control valve is positioned in response to deceleration only when the deceleration is more than a predetermined amount.

154. The operating method of claim 153, further including charge forming means for supplying fuel to the combustion chamber and discontinuing the supply of fuel to the combustion chamber by the charge forming means when the deceleration is more than a predetermined amount.

155. The operating method of claim 154, wherein the control valve is moved to its turbulence generating position when the supply of fuel is discontinued.

156. The operating method of claim 155, wherein the charge forming means is controlled to resume the supply of fuel when the deceleration condition has fallen below a predetermined amount.

157. The operating method of claim 156, further including opening the control valve means to provide less turbulence when the fuel is again supplied.

158. The operating method of claim 157, further including providing additional fuel to the engine when the control valve is moved to its position for decreasing the amount of turbulence.

159. The operating method of claim 133, wherein the transient condition is starting of the engine.

160. The operating method of claim 159, wherein the control valve is moved to its turbulence generating position upon the initiation of starting.

161. The operating method of claim 160, further including charge forming means for supplying fuel to the engine and supplying additional fuel to the engine from the charge forming means upon starting.

162. The operating method of claim 161, wherein the amount of additional fuel supplied is reduced when the control valve means is moved to a position for generating more turbulence in the combustion chamber.

163. The operating method of claim 162, further including measuring the temperature of the engine and controlling the position of the control valve in response to the measured temperature.

164. The operating method of claim 162, further including measuring the temperature of the engine and controlling the amount of additional fuel supplied in response to the measured temperature.

165. The operating method of claim 133, wherein the transient condition comprises engine warmup.

166. The operating method of claim 165, wherein engine warmup is determined if the temperature is below a predetermined temperature.

167. The operating method of claim 166, wherein the predetermined temperature is a temperature substantially lower than normal running temperature.

168. The operating method of claim 167, further including change forming means for supplying fuel to the engine and causing the charge forming means to supply additional fuel to the engine in response to warm-up conditions.

169. The operating method of claim 168, wherein the amount of additional fuel supplied to the engine by the charge forming means is decreased when the control valve is in a position for generating increased turbulence.

170. The operating method of claim 133, further including charge forming means for supplying fuel to the engine and controlling the amount of fuel supplied by the charge forming means in response to the sensed engine conditions.

171. The operating method of claim 170, wherein the amount of fuel supplied to the engine by the charge forming means is decreased when the control valve is in a position for generating turbulence in the combustion chamber.

172. The operating method of claim 133, wherein the engine comprises a reciprocating engine and one of the relatively movable components comprises a cylinder block, cylinder head assembly and the other of the relatively movable components comprises a piston slidably supported within a cylinder bore in the cylinder block.

173. The operating method of claim 172, wherein the induction system comprises an intake passage formed at least in part in the cylinder head and terminating at the combustion chamber.

174. The operating method of claim 173, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

175. The operating method of claim 174, wherein the turbulence comprises at least one of tumble or swirl.

176. The operating method of claim 175, wherein both tumble and swirl are generated under at least one condition of the control valve.

177. The operating method of claim 175, further including a charge forming device for supplying fuel to the engine.

178. The operating method of claim 170, wherein the amount of fuel supplied to the engine by the charge forming means is decreased when the control valve is in a position for generating turbulence in the combustion chamber.

179. An operating method for an internal combustion engine comprised of a pair of relatively movable components defining a combustion chamber of a volume which varies cyclicly upon the relative movement of the components, an induction system for delivering an intake charge to the combustion chamber, control valve means in said induction system and movable between a first position wherein the charge which enters the combustion chamber from the induction system is at a relatively low velocity and generates substantially no turbulence in the combustion chamber, and a second position wherein the charge entering the chamber flows at a higher velocity due to a restriction in the area of the intake passage and in a direction for creating turbulence in the combustion chamber, said method comprising the steps of setting a target idle speed and operating the control valve means to maintain the target idle speed.

180. The operating method of claim 179, wherein the control valve is moved to a position to generate more turbulence when the idle speed is lower than the target idle speed.

181. The operating method of claim 179, wherein the control valve is moved to a position to create less turbulence when the idle speed is higher than the target idle speed.

182. The operating method of claim 181, wherein the control valve is also moved to a position to generate more turbulence when the idle speed is less than the target idle speed.

183. The operating method of claim 182, further including controlling the target idle speed in response to the sensed temperature of the engine.

184. The operating method of claim 179, further including controlling the target idle speed in response to the sensed temperature of the engine.

185. The operating method of claim 179, wherein the engine comprises a reciprocating engine and one of the relatively movable components comprises a cylinder block cylinder head assembly and the other of the relatively movable components comprises a piston slidably supported within a cylinder bore in the cylinder block.

186. The operating method of claim 172, wherein the induction system comprises an intake passage formed at least in part in the cylinder head and terminating at the combustion chamber.

187. The operating method of claim 186, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

188. The operating method of claim 187, wherein the turbulence comprises at least one of tumble or swirl.

189. The operating method of claim 188, wherein the control valve is moved to a position to generate more turbulence when the idle speed is lower than the target idle speed.

190. The operating method of claim 188, wherein the control valve is moved to a position to create less turbulence when the idle speed is higher than the target idle speed.

191. The operating method of claim 190, wherein the control valve is also moved to a position to generate more turbulence when the idle speed is less than the target idle speed.

192. An operating method for an internal combustion engine comprising a pair of relatively movable components defining a combustion chamber the volume of which varies cyclicly during the relative movement of the components, an induction system for delivering an intake charge to said combustion chamber, control valve means in said induction system movable between a first position wherein the charge which enters the combustion chamber from the induction system is at a relatively low velocity and wherein the charge generates substantially no turbulence in the combustion chamber, and a second position wherein the charge enters the chamber at a relatively higher velocity due to a restriction in the effective cross-sectional area of the induction system, and wherein turbulence is generated in the combustion chamber, an exhaust system for discharging exhaust gases from the combustion chamber, an exhaust gas recirculation system for circulating exhaust gases back from the exhaust system to the combustion chamber through said induction system, exhaust control valve means for controlling the amount of exhaust gases recirculated by said exhaust gas recirculation system, said method comprising the step of controlling the position of said control valve means and said exhaust gas control valve means in response to the condition of each other.

193. The operating method of claim 192, wherein the amount of exhaust gases supplied to the combustion chamber is increased in response to an increase in the amount of turbulence generated by the control valve.

194. The operating method of claim 192, wherein the amount of turbulence is increased when the amount of exhaust gases delivered to the combustion chamber is increased.

195. The operating method of claim 192, wherein the exhaust gases are delivered to the combustion chamber through the induction system at a point upstream of the control valve.

196. The operating method of claim 195, further including delaying the change in the position of the control valve until a change in the amount of exhaust gas flow will have reached the control valve.

197. The operating method of claim 196, wherein the delay in the change of the position of the control valve is done only when the amount of exhaust gases delivered to the combustion chamber is reduced.

198. The operating method of claim 192, wherein the engine comprises a reciprocating engine and one of the relatively movable components comprises a cylinder block cylinder head assembly and the other of the relatively movable components comprises a piston slidably supported within a cylinder bore in the cylinder block.

199. The operating method of claim 198, wherein the induction system comprises an intake passage formed at least in part in the cylinder head and terminating at the combustion chamber.

200. The operating method of claim 199, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

201. The operating method of claim 200, wherein the turbulence comprises at least one of tumble or swirl.

202. The operating method of claim 201, wherein the amount of exhaust gases supplied to the combustion chamber is increased in response to an increase in the amount of turbulence generated by the control valve.

203. The operating method of claim 201, wherein the amount of turbulence is increased when the amount of exhaust gases delivered to the combustion chamber is increased.

204. The operating method of claim 201, wherein the exhaust gases are delivered to the combustion chamber through the induction system at a point upstream of the control valve.

205. The operating method of claim 204, further including delaying the change in the position of the control valve until a change in the amount of exhaust gas flow will have reached the control valve.

206. The operating method of claim 205, wherein the delay in the change of the position of the control valve is done only when the amount of exhaust gases delivered to the combustion chamber is reduced.

207. An operating method for an internal combustion engine comprised of a pair of a pair of relatively movable components defining a combustion chamber the volume of which varies cyclicly upon relative movement of said components, an induction system for supplying an intake charge to said combustion chamber, control valve means in said induction system and movable between a first position wherein a charge from said induction system enters said combustion chamber without substantial restriction and without substantial turbulence, and a second position wherein the charge entering said combustion chamber from said induction system is restricted and flows at a higher velocity and generates turbulence in said combustion chamber, operator controlled means for controlling the speed of said engine, said method comprising the steps of moving said control valve between its positions in response to actuation of said operator controlled means for varying the amount of turbulence generated in said combustion chamber when said operator control means is in a transient condition.

208. The operating method of claim 207, further including charge forming means for supplying fuel to the engine and varying the amount of fuel delivered by the charge forming means in response to the condition of the control valve.

209. The operating method of claim 208, wherein the amount of fuel supplied is less when the control valve is in a position to generate more turbulence in the combustion chamber.

210. The operating method of claim 207, wherein the change of speed comprises an acceleration.

211. The operating method of claim 210, further including charge forming means for supplying fuel to the combustion chamber and providing additional fuel to the engine from the charge forming means in response to the acceleration condition.

212. The operating method of claim 211, wherein the amount of additional fuel supplied to the engine upon acceleration is decreased as the control valve is positioned in a position to increase the turbulence in the combustion chamber.

213. The operating method of claim 207, wherein the change of speed condition comprises a deceleration.

214. The operating method of claim 213, wherein the control valve is positioned in response to deceleration only when the deceleration is more than a predetermined amount.

215. The operating method of claim 214, further including charge forming means for supplying fuel to the combustion chamber and discontinuing the supply of fuel to the combustion chamber by the charge forming means when the deceleration is more than a predetermined amount.

216. The operating method of claim 215, wherein the control valve is moved to its turbulence generating position when the supply of fuel is discontinued.

217. The operating method of claim 216, wherein the charge forming means is controlled to resume the supply of fuel when the deceleration condition has fallen below a predetermined amount.

218. The operating method of claim 217, further including opening the control valve means to provide less turbulence when the fuel is again supplied.

219. The operating method of claim 218, further including providing additional fuel to the engine when the control valve is moved to a position for decreasing the amount of turbulence.

220. The operating method of claim 207, wherein the engine comprises a reciprocating engine and one of the relatively movable components comprises a cylinder block cylinder head assembly and the other of the relatively movable components comprises a piston slidably supported within a cylinder bore in the cylinder block.

221. The operating method of claim 220, wherein the induction system comprises an intake passage formed at least in part in the cylinder head and terminating at the combustion chamber.

222. The operating method of claim 221, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

223. The operating method of claim 222, wherein the turbulence comprises at least one of tumble or swirl.

224. The operating method of claim 223, further including charge forming means for supplying fuel to the engine and varying the amount of fuel delivered by the charge forming means in response to the position of the control valve.

225. The operating method of claim 224, wherein the amount of fuel supplied is less when the control valve is in a position to generate more turbulence in the combustion chamber.

226. The operating method of claim 223, wherein the change of speed comprises an acceleration.

227. The operating method of claim 226, further including charge forming means for supplying fuel to the combustion chamber and providing additional fuel to the engine from the charge forming means in response to the acceleration condition.

228. The operating method of claim 227, wherein the amount of additional fuel supplied to the engine upon acceleration is decreased as the control valve is positioned in a condition to increase the turbulence in the combustion chamber.

229. The operating method of claim 223, wherein the change of speed condition comprises a deceleration.

230. The operating method of claim 229, wherein the control valve is positioned in response to deceleration only when the deceleration is more than a predetermined amount.

231. The operating method of claim 230, further including charge forming means for supplying fuel to the combustion chamber and discontinuing the supply of fuel to the combustion chamber by the charge forming means when the deceleration is more than a predetermined amount.

232. The operating method of claim 231, wherein the control valve is moved to its turbulence generating position when the supply of fuel is discontinued.

233. The operating method of claim 232, wherein the charge forming means is controlled to resume the supply of fuel when the deceleration condition has fallen below a predetermined amount.

234. The operating method of claim 233, further including opening the control valve means to provide less turbulence when the fuel is again supplied.

235. The operating method of claim 234, further including providing additional fuel to the engine when the control valve is moved to a position for decreasing the amount of turbulence.

236. An operating method for an internal combustion engine comprising a pair of relatively movable components defining a combustion chamber, the volume of which varies cyclicly upon the relative movement of said components, an induction system for supplying an intake charge to said combustion chamber, control valve means in said induction system and movable between a first position wherein the charge entering said combustion chamber is substantially unrestricted and generates substantially no turbulence in the combustion chamber, and a second position wherein the charge entering the combustion chamber is restricted for increasing its velocity and for generating turbulence within said combustion chamber, means for starting said engine, said method comprising the steps of sensing operation of said means for starting said engine and operating said control valve between its positions in response to operation of the starting means.

237. The operating method of claim 236, wherein the control valve is moved to a turbulence generating position upon the initiation of starting.

238. The operating method of claim 237, further including charge forming means for supplying fuel to the engine and supplying additional fuel to the engine from the charge forming means upon starting.

239. The operating method of claim 238, wherein the amount of additional fuel supplied is reduced when the control valve means is moved to a position for generating more turbulence in the combustion chamber.

240. The operating method of claim 239, further including measuring the temperature of the engine and controlling the position of the control valve in response to the measured temperature.

241. The operating method of claim 239, further including measuring the temperature of the engine and means for controlling the amount of additional fuel supplied in response to the measured temperature.

242. The operating method of claim 236, wherein the engine comprises a reciprocating engine and one of the relatively movable components comprises a cylinder block cylinder head assembly and the other of the relatively movable components comprises a piston slidably supported within a cylinder bore in the cylinder block.

243. The operating method of claim 242, wherein the induction system comprises an intake passage formed at least in part in the cylinder head and terminating at the combustion chamber.

244. The operating method of claim 243, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

245. The operating method of claim 244, wherein the turbulence comprises at least one of tumble or swirl.

246. The operating method of claim 245, wherein the control valve is moved to as turbulence generating position upon the initiation of starting.

247. The operating method of claim 246, further including charge forming means for supplying fuel to the engine and supplying additional fuel to the engine from the charge forming means upon starting.

248. The operating method of claim 247, wherein the amount of additional fuel supplied is reduced when the control valve means is moved to a position for generating more turbulence in the combustion chamber.

249. The operating method of claim 248, further including measuring the temperature of the engine and controlling the position of the control valve in response to the measured engine temperature.

250. The operating method of claim 248, further including measuring the temperature of the engine and means for controlling the amount of additional fuel supplied in response to the measured engine temperature.

251. An operating method for an internal combustion engine comprised of a pair of relatively movable components defining a combustion chamber that varies cyclicly in volume upon relative movement of said components, an induction system for supplying an intake charge to said combustion chamber, control valve means in said induction system and movable between a first position wherein the charge entering said combustion chamber is substantially unrestricted and generates substantially no turbulence in said combustion chamber, and a second position wherein the charge flowing through said induction system is restricted for increasing its velocity and for generating turbulence in said combustion chamber, said method comprising the steps of sensing the temperature of said engine and operating said control valve means between said positions in response to changes in the temperature of said engine.

252. The operating method of claim 251, wherein the temperature comprises an engine warm-up temperature.

253. The operating method of claim 252, wherein engine warmup is determined if the temperature is below a predetermined temperature.

254. The operating method of claim 253, wherein the predetermined temperature is a temperature substantially lower than normal running temperature.

255. The operating method of claim 254, further including charge forming means for supplying fuel to the engine and causing the charge forming means to supply additional fuel to the engine in response to warm-up conditions.

256. The operating method of claim 251, wherein the engine comprises a reciprocating engine and one of the relatively movable components comprises a cylinder block, cylinder head assembly and the other of the relatively movable components comprises a piston slidably supported within a cylinder bore in the cylinder block.

257. The operating method of claim 256, wherein the induction system comprises an intake passage formed at least in part in the cylinder head and terminating at the combustion chamber.

258. The operating method of claim 257, wherein the control valve extends across the intake passage and is movable between a first position wherein the intake passage configuration is not interrupted and a second position wherein the control valve extends into the intake passage for redirecting the flow of charge into the combustion chamber from the intake passage to generate the turbulence.

259. The operating method of claim 258, wherein the turbulence comprises at least one of tumble or swirl.

260. The operating method of claim 259, wherein the transient condition comprises engine warmup.

261. The operating method of claim 260, wherein engine warmup is determined if the temperature is below a predetermined temperature.

262. The operating method of claim 261, wherein the predetermined temperature is a temperature substantially lower than normal running temperature.

263. The operating method of claim 262, further including charge forming means for supplying fuel to the engine and causing the charge forming means to supply additional fuel to the engine in response to warm-up conditions.

264. The operating method of claim 263, wherein the amount of additional fuel supplied to the engine by the charge forming means is decreased when the control valve is in a position for generating increased turbulence.

\* \* \* \* \*